US008020828B2

(12) United States Patent
Carnevali

(10) Patent No.: US 8,020,828 B2
(45) Date of Patent: Sep. 20, 2011

(54) WEDGE LOCK ANCHOR MOUNT

(76) Inventor: Jeffrey D. Carnevali, Seattle, WA (US)

( * ) Notice: Subject to any disclaimer, the term of this patent is extended or adjusted under 35 U.S.C. 154(b) by 294 days.

(21) Appl. No.: 12/069,219

(22) Filed: Feb. 8, 2008

(65) Prior Publication Data
US 2008/0138152 A1    Jun. 12, 2008

Related U.S. Application Data

(63) Continuation-in-part of application No. 11/118,734, filed on Apr. 29, 2005, now Pat. No. 7,802,768.

(51) Int. Cl.
F16M 11/00    (2006.01)
F16B 2/14     (2006.01)

(52) U.S. Cl. ........ 248/412; 248/407; 248/413; 403/370; 403/374.4

(58) Field of Classification Search .......... 403/370, 403/374.1, 374.2, 367, 109.5, 409.1; 280/415.1; 74/551.1; 248/125.8, 161, 188.5, 412, 407, 248/413, 22.14, 224.7
See application file for complete search history.

(56) References Cited

U.S. PATENT DOCUMENTS

| 612,489 | A | * | 10/1898 | Dean | 403/370 |
| 3,885,882 | A | * | 5/1975 | Curti | 403/297 |
| 4,274,301 | A | * | 6/1981 | Katayama | 403/370 |
| 5,197,349 | A | * | 3/1993 | Herman | 403/374.4 |
| 5,233,304 | A | * | 8/1993 | Hubans | 324/323 |
| 5,244,133 | A | * | 9/1993 | Abbott et al. | 403/370 |
| 5,323,600 | A | * | 6/1994 | Munshi | 60/772 |
| 5,330,302 | A | * | 7/1994 | Chen | 74/551.1 |
| 5,423,566 | A | * | 6/1995 | Warrington et al. | 280/415.1 |
| 5,540,457 | A | * | 7/1996 | Johnson | 403/370 |
| 6,045,109 | A | * | 4/2000 | Mashburn et al. | 248/511 |
| 6,835,021 | B1 | * | 12/2004 | McMillan | 403/374.4 |

* cited by examiner

Primary Examiner — Tan Le
(74) Attorney, Agent, or Firm — Charles J. Rupnick

(57) ABSTRACT

An anchor mount formed of: a mounting device; a laterally expandable locking mechanism coupled to the base of the mounting device, the laterally expandable locking mechanism including first and second cooperating wedges, the first wedge being coupled to the base of the mounting device, and the second wedge being movable along an inclined plane of mutual contact with the first wedge and substantially laterally expandable relative thereto; a reaction surface fixed relative to the first wedge; an actuator having an actuation surface that is positioned adjacent to the reaction surface and movable relative thereto; and the second wedge being responsive to motion of the actuation surface of the actuator relative to the reaction surface for moving along the inclined plane of mutual contact with the first wedge and substantially laterally expanding relative thereto.

19 Claims, 19 Drawing Sheets

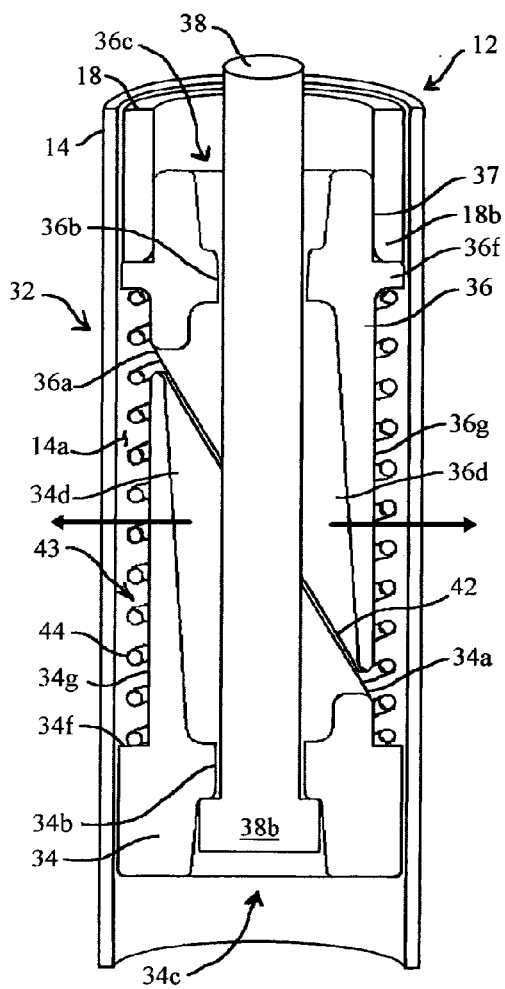
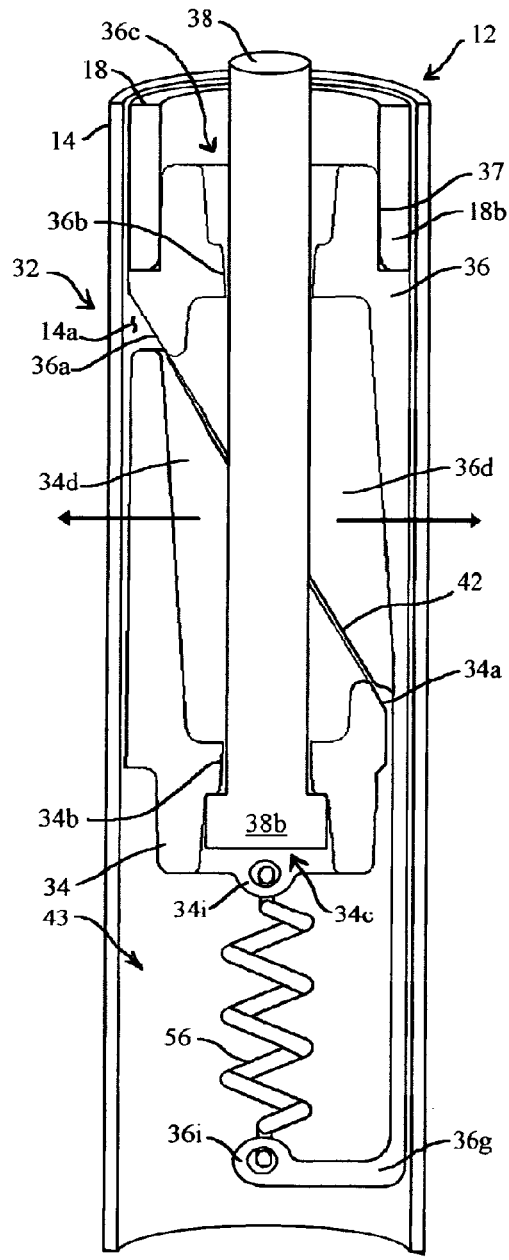
Figure 10
Figure 11

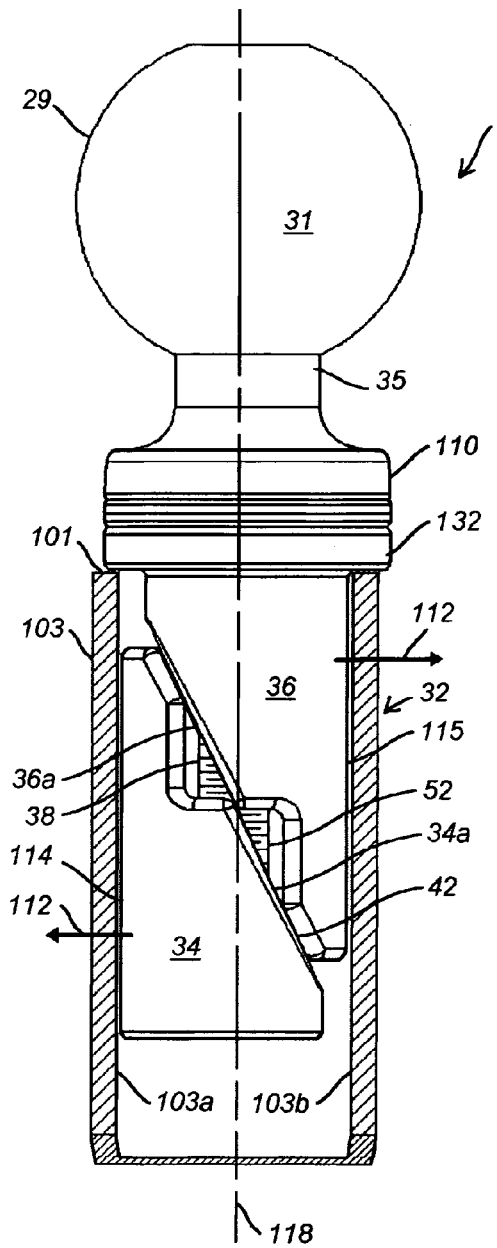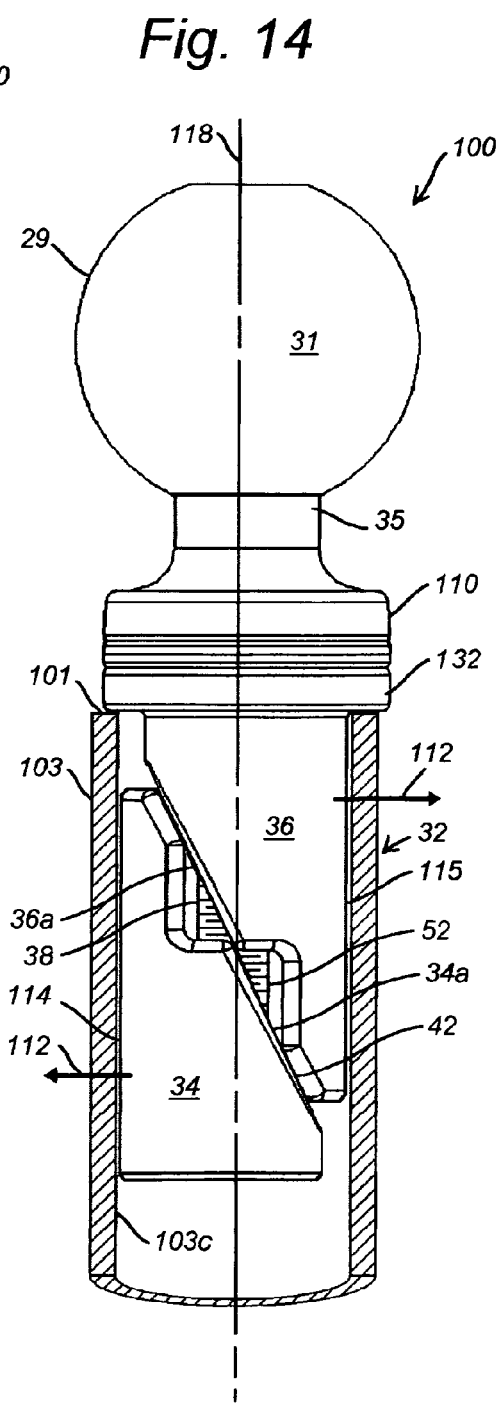

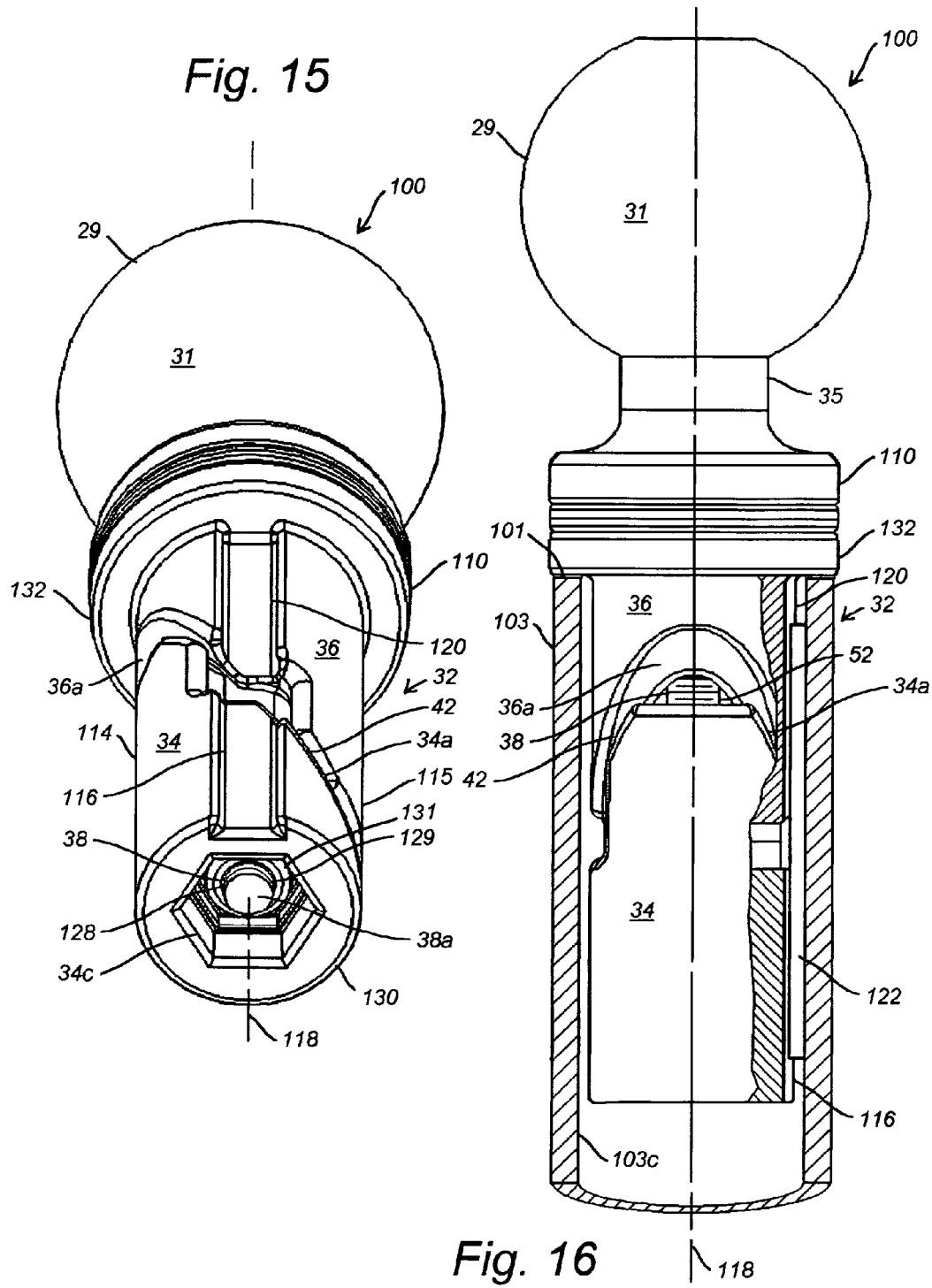

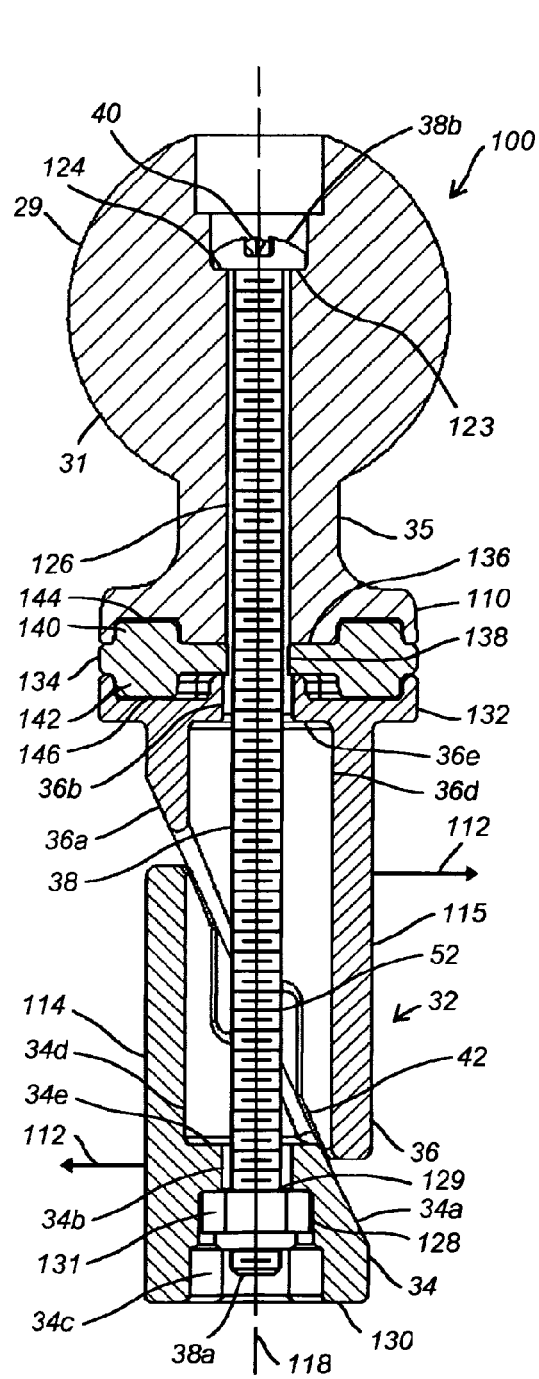
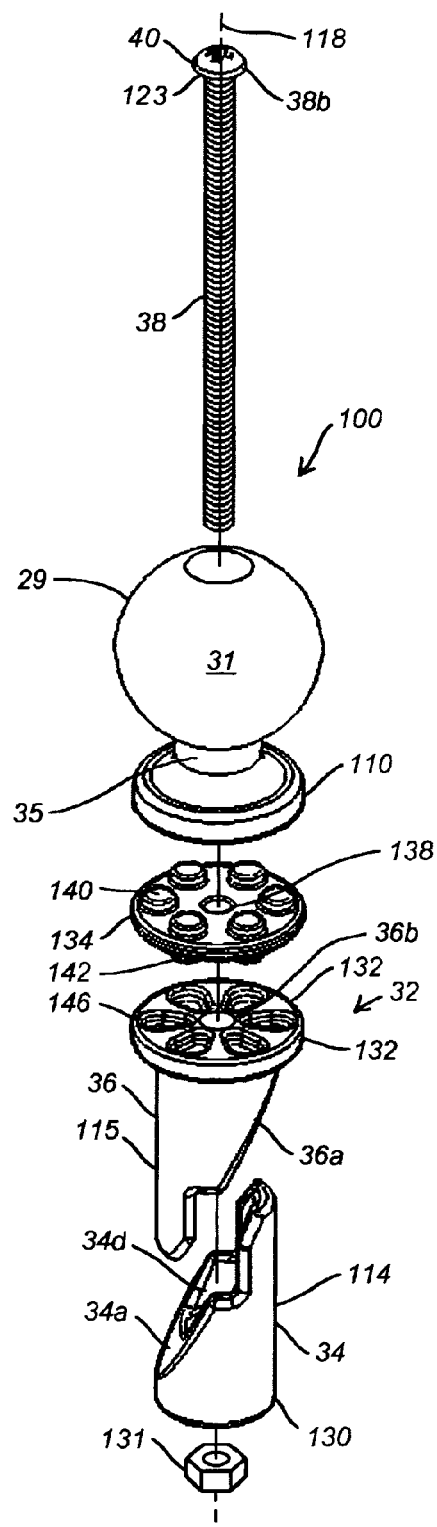
Fig. 17
Fig. 18

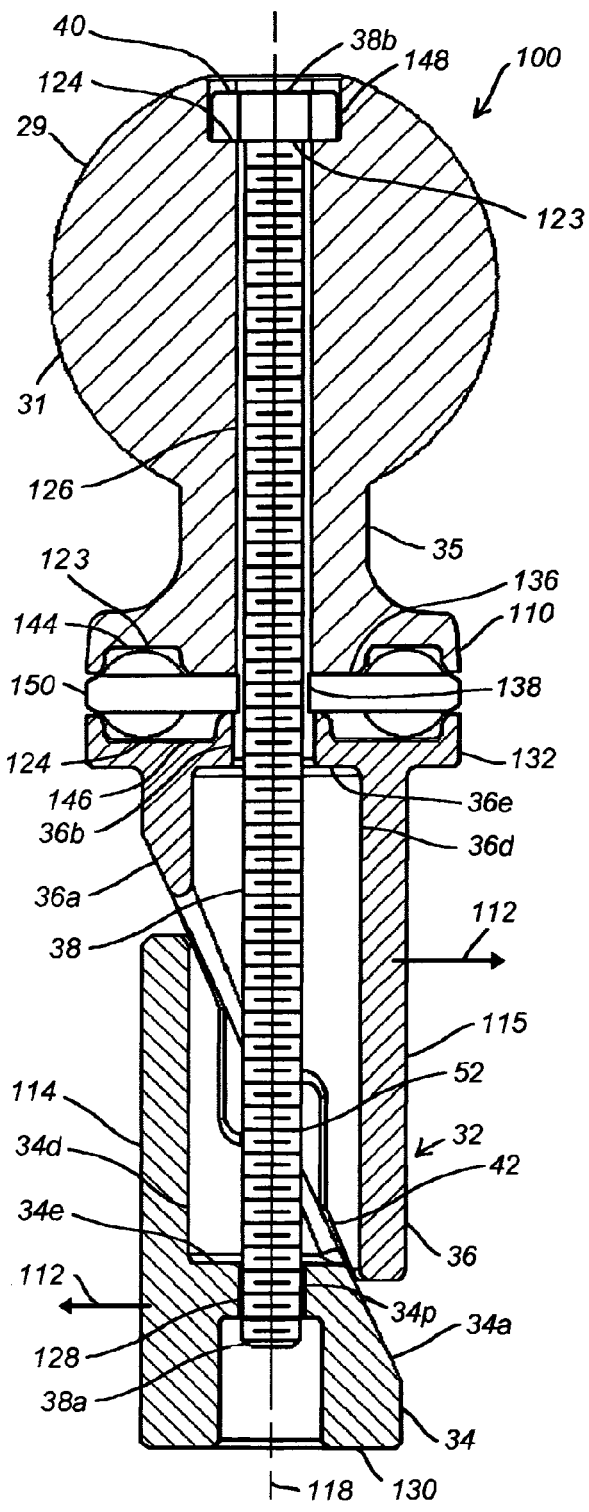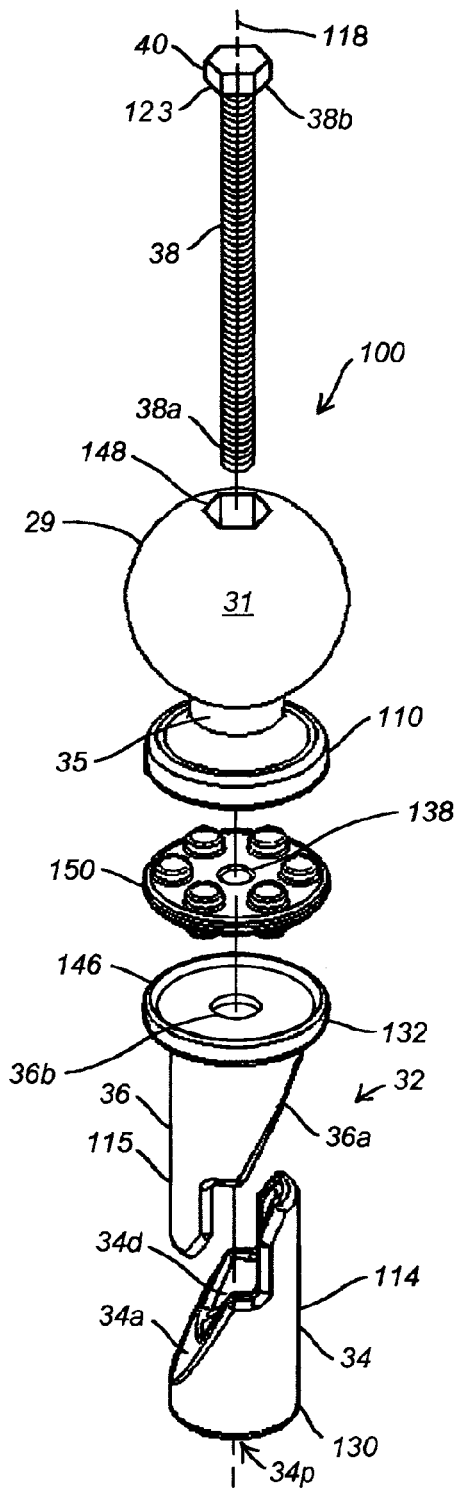
Fig. 19
Fig. 20

WEDGE LOCK ANCHOR MOUNT

This application is a Continuation-in-part and claims priority benefit of U.S. patent application Ser. No. 11/118,734 filed in the name of Jeffrey D. Carnevali on Apr. 29, 2005 now U.S. Pat. No. 7,802,768, the complete disclosures of which are both incorporated herein by reference.

FIELD OF THE INVENTION

The present invention relates to trays for holding portable devices, and in particular to locking trays for holding portable electronic devices, including lap top computers and other similarly sized electronics devices.

BACKGROUND OF THE INVENTION

Lengthwise locking mechanisms for telescoping pole devices are generally well known. However, such known lengthwise locking mechanisms in general tend to fail when any portion of the telescoping pole is rotated relative to another portion thereof. Subsequently, the telescoping portions of the pole become unlocked, and slide one within the other, thereby releasing the locking mechanism.

Furthermore, it is known to provide mounting platforms that can accommodate the limited available space normally found in a vehicle for mounting add-on equipment. These mounting platforms must be able to handle the load of the accessory device in the vibration and shock environment encountered in a moving vehicle while still permitting the accessory device to be quickly and easily installed in the mounting platform. The mounting platform itself must be easily and quickly universally adjustable to provide maximum positional flexibility. The mounting platforms must also accommodate the various shapes of accessory devices being installed, while conforming to the limited, generally oddly-shaped space available in which to mount the platform and the accessory device. Various mounting platforms are currently in use of different configurations that mount either on the vehicle's center console or dash board. However, security of the accessory device remains uncertain.

Consequently, it is desirable to have improvements in the lengthwise locking mechanisms of telescoping poles, and in particular as applied to mounting platforms for accessory devices.

Additionally, pipe and tube hole plugs are generally well-known. However, known pipe and tube hole plug apparatus are limited in their ability to provide efficient and reliable mounting apparatus external of the plugged pipe or tube.

SUMMARY OF THE INVENTION

The present invention overcomes limitations of the prior art by providing an anchor mounting platform having an internal locking mechanism for securing the mounting platform relative to a female receptacle such as a tube or pipe, and a disengaging mechanism for disengaging the internal locking mechanism and releasing the platform.

According to one aspect of the invention, the anchor mounting platform includes a mounting device having a substantially rigid base and a reaction surface, and a laterally expandable locking mechanism coupled to the base of the mounting device and substantially aligned along a longitudinal axis substantially perpendicular thereto. The laterally expandable locking mechanism includes: a first wedge coupled to the base of the mounting device and having a first outer contact surface oriented substantially parallel with the longitudinal axis and a reaction surface inclined relative thereto; a second wedge cooperating with the first wedge, the second wedge having a second outer contact surface opposite from the first outer contact surface of the first wedge and oriented substantially parallel with the longitudinal axis, and a drive surface inclined relative thereto and substantially positioned in a cooperating relationship with the inclined reaction surface of the first wedge and being nominally slidable there along toward the base of the mounting device and laterally of the longitudinal axis; a thread mechanism substantially aligned with the longitudinal axis; and an actuator having an actuation surface that is positioned adjacent to the reaction surface of the mounting device opposite from the first wedge, and further including a threaded coupler extended between the actuation surface and the second wedge and matched to the thread mechanism.

According to another aspect of the anchor mounting platform, the threaded coupler further includes an elongated threaded shaft having a head portion adjacent to a first end thereof and providing the actuator with an underside thereof further providing the actuation surface, and a male thread adjacent to a second end thereof spaced away from the head portion; and the thread mechanism further includes a mating female thread substantially nonrotationally coupled to the second wedge.

According to another aspect of the anchor mounting platform, the first wedge further includes a first keyway, and the second wedge further includes a second keyway substantially aligned with the first keyway; and the anchor mounting platform further includes a substantially rigid key coupled between the first and second keyways of the respective first and second wedges.

According to another aspect of the anchor mounting platform, the base of the mounting device is further substantially nonrotationally coupled to the first wedge opposite from the inclined reaction surface thereof.

According to another aspect of the anchor mounting platform, the second wedge further includes a nut pocket opposite from the inclined drive surface thereof; and the mating female thread of the thread mechanism further includes a mating nut positioned in the nut pocket.

According to another aspect of the anchor mounting platform, the first wedge further includes a shoulder portion opposite from the inclined reaction surface thereof and adjacent to the base of the mounting device.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 10 is a close-up cross sectional view that illustrates an alternative embodiment of a disengaging mechanism of the invention for disengaging the lengthwise locking mechanism of the invention;

FIG. 11 is a close-up cross sectional view that illustrates another alternative embodiment of a disengaging mechanism of the invention for disengaging the lengthwise locking mechanism of the invention;

FIGS. 13 and 14 are each cross sectional views that illustrate the invention embodied as a novel anchor mounting platform, wherein FIG. 13 illustrates the novel anchor mounting platform having the cooperating wedges of the laterally expandable lengthwise locking mechanism structured for operating in a female receptacle having a square or otherwise rectangular interior wall, and FIG. 14 illustrates the novel anchor mounting platform having the cooperating wedges of the laterally expandable lengthwise locking mechanism structured for operating in a pipe, tube or other female receptacle having a generally cylindrical interior wall;

FIG. 15 is a bottom perspective view of the novel anchor mounting platform that illustrates another alternative configuration for restricting the movable farther wedge from turning in the pipe, tube or other female receptacle regardless of internal wall configuration;

FIG. 16 is a partial cross-section view taken through a keyway of the movable farther wedge and, when present, a keyway of the stationary nearer wedge;

FIG. 17 is a cross-sectional view of one embodiment of the novel anchor mounting platform;

FIG. 18 is an exploded assembly view of the configuration of the novel anchor mounting platform as embodied in FIG. 17;

FIG. 19 illustrates the novel anchor mounting platform wherein a female thread mechanism of a threaded drive is alternatively provided on the movable far wedge by a threaded end of a threaded coupler being mated with a lengthwise female threaded passage in the movable farther wedge;

FIG. 20 is an exploded assembly view of the configuration of the novel anchor mounting platform as embodied in FIG. 19;

FIGS. 27 and 28 are exploded assembly views of the configuration of the alternative novel anchor mounting platform of FIGS. 25 and 26, wherein FIG. 27 is an upward perspective view of the exploded assembly of the alternative novel anchor mounting platform, and FIG. 28 is a downward perspective view of the exploded assembly.

DETAILED DESCRIPTION OF PREFERRED EMBODIMENT

In the Figures, like numerals indicate like elements.

Figure 1:
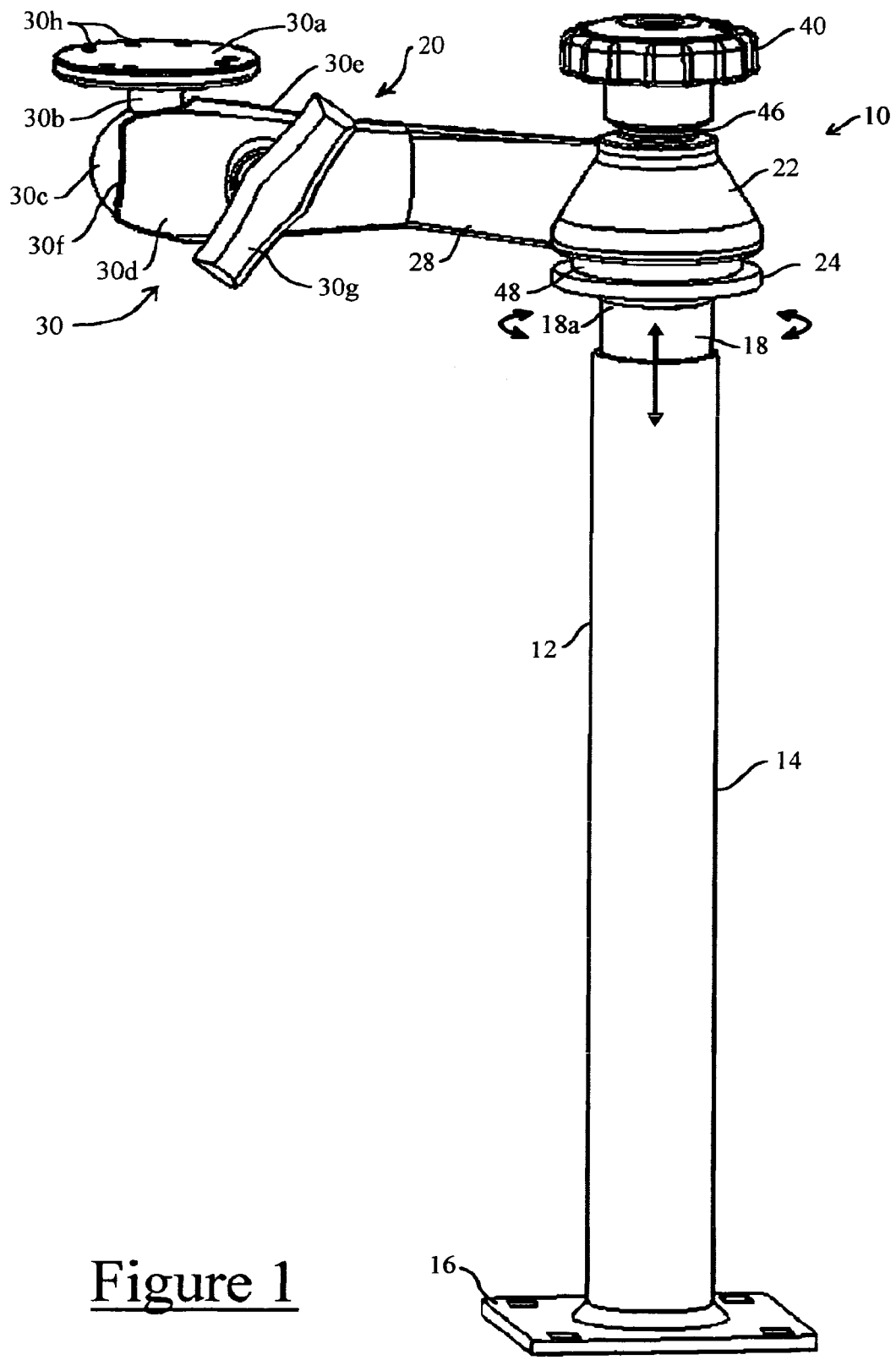
FIG. 1 is a perspective view that illustrates by example and without limitation the present invention embodied as a telescoping pole mount.

FIG. 1 illustrates the present invention by example and without limitation embodied as a telescoping pole mount 10 having at its core a telescoping pole 12 formed of an outer female tube 14 standing on a base plate 16, and an inner male tube 18 sized to slide lengthwise within the female tube 14, as indicated by the straight arrows, to different lengthwise relative positions. The relative positions of the female and male tubes 14, 18 of the telescoping pole 12 are arbitrary and are optionally reversed in a device that practices the present invention within the scope and intent of the present invention. A rotatable apparatus or mechanical arm 20 is mounted on the male tube 18 external to the female tube 14 and is rotatable about the telescoping pole 12, as indicated by the curved arrows, without unlocking the female and male tubes 14, 18.

According to embodiment, the rotatable mechanical arm 20 includes a hub 22 that rotates completely around the pole 12 on a substantially planar platform 24 that is optionally fixed stationary to one end 18a of the male tube 18 that remains external to the female tube 14. When stationary, the platform 24 is for example threaded, machined, molded, cast, welded or otherwise securely fixed to the external end 18a of the male tube 18. Alternatively, the platform 24 is free to rotate about the telescoping pole 12, as indicated by the curved arrows, without unlocking the female and male tubes 14, 18.

According to this embodiment of the invention, the rotatable arm 20 includes an arm 28 that extends away outward from the pole 12. By example and without limitation, the arm 28 culminates in a ball and socket mounting apparatus 30 of the type described in U.S. Pat. No. 5,845,885, which is incorporated by reference herein in its entirety. For example, the ball and socket mounting apparatus 30 provides a positionable mounting platform 30a extended on a post 30b from a sphere 30c of resiliently compressible material that is angularly and rotationally positionable between a pair of clamping arms 30d, 30e that together form a socket 30f that is clamped about the sphere 30c when a clamping mechanism 30g is engaged and tightened. The sphere 30c of resiliently compressible material is captured in the socket 30f by increased tightening of the clamping mechanism 30g to squeeze together the clamping arms 30d, 30e. The positionable mounting platform 30a (shown with a pattern of mounting holes 30h) is optionally structured to any device or structure of the user's choice.

Figure 2:
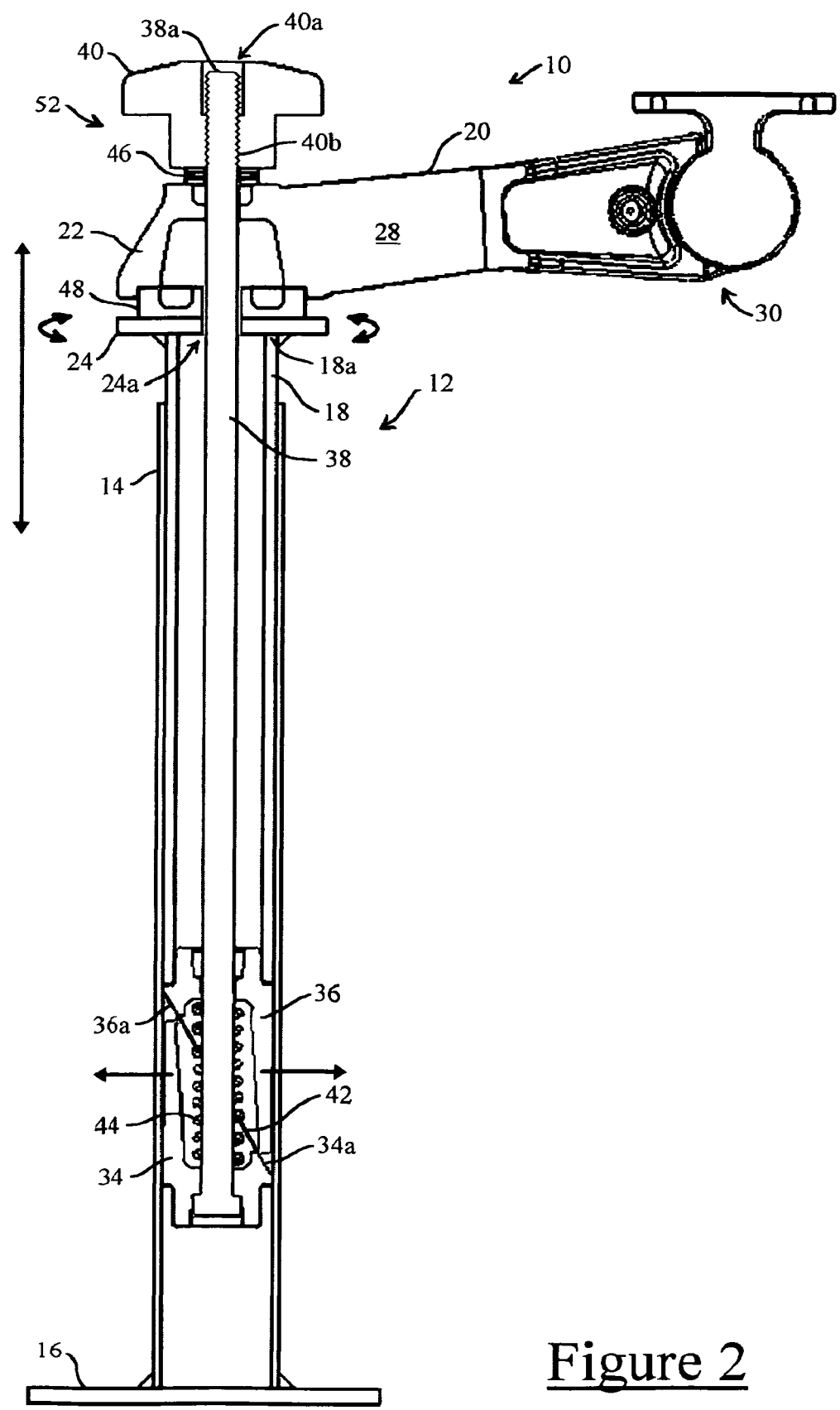
FIG. 2 is a cross sectional view that illustrates one embodiment of the telescoping pole mount of the invention.

FIG. 2 is a cross sectional view of the telescoping pole mount 10 of the invention that illustrates the telescoping pole 12 of the invention with the male tube 18 locked within the female tube 14 at a selected elevation by a lengthwise locking mechanism 32. According to one embodiment of the invention, the lengthwise locking mechanism 32 is formed by a pair of cooperating wedges 34, 36 that are forced apart laterally by sliding along a sharply inclined plane of mutual contact 42 that is formed between respective inclined surfaces 34a, 36a when their combined lengthwise dimension is forcefully compressed. According to one embodiment of the invention, the cooperating wedges 34, 36 are substantially identical in configuration so that a single wedge form or mold is used to produce both of the pair of cooperating wedges 34, 36. However, substantial identity between the cooperating wedges 34, 36 is not necessary and may be eliminated in a practical application of the invention, as discussed herein below.

A lengthwise drive mechanism 52 of the invention cooperates with the lengthwise locking mechanism 32 for driving the cooperating wedges 34, 36 together along the inclined plane of mutual contact 42. By example and without limitation, the lengthwise drive mechanism 52 of the invention is configured to pull the inclined surface 34a of the farther wedge 34 against the inclined surface 36a of the nearer wedge 36 along the inclined plane of mutual contact 42. According to one embodiment of the invention, the lengthwise drive mechanism 52 of the invention is configured having a coupler 38 that is coupled to the farther wedge 34 and extended past the nearer wedge 36 and through the male tube 18 and beyond the platform 24 at the male tube's external end 18a. An actuator 40 is coupled to the coupler 38 external of the male tube 18 for driving the coupler 38 relative to the platform 24. In other words, the actuator 40 is structured for drawing the farther wedge 34 against the nearer wedge 36 by pulling the coupler 38 along the male tube 18 toward the platform 24 at the male tube's external end 18a.

By example and without limitation, the coupler 38 is embodied as an elongated bolt or threaded rod 38 that is extended lengthwise through the two cooperating wedges 34, 36; the actuator 40 is embodied as a threaded knob actuator 40 that engages a first threaded end of the 38a of the coupler 38 external of the male tube 18 beyond the platform 24. Turning the knob actuator 40 against the external platform 24 pulls the end 38a of the coupler 38 through the male tube 18, which in turn causes the threaded rod coupler 38 to draw the farther wedge 34 lengthwise along the inside of the outer female tube 14. Other lengthwise drive mechanisms 52 are also contemplated for drawing the farther wedge 34 against the nearer wedge 36 and may be substituted without deviating from the scope and intent of the invention. For example, a cam and lever are optionally substituted for the threaded rod coupler 38 and knob actuator 40 of the lengthwise drive mechanism 52.

At least the threaded end 38a of the rod coupler 38 is extended external to the male tube 18 and platform 24 by, for example, passing though a clearance hole 24a through the platform 24 that is substantially aligned with the center of the male tube 18, and thus simultaneously substantially centers the rod coupler 38 relative to both of the surrounding tubes 14, 18. The knob actuator 40 is provided with a lengthwise bore 40a that is at least partially formed with an internal female thread 40b matched to male threads 38a formed on the rod coupler 38. Turning the knob actuator 40 pulls the rod coupler 38 through the male tube 18, which simultaneously draws the farther cooperating wedge 34 lengthwise of the female tube 14 and against the nearer cooperating wedge 36. The respective sharply inclined surfaces 34a, 36a of the cooperating wedges 34, 36 interact along a sharply inclined plane of mutual contact 42 which forces the cooperating wedges 34, 36 to move crosswise to one another and laterally of the male tube 18, as indicated by the outwardly pointing arrows. This relative crosswise motion drives the cooperating wedges 34, 36 to jam and wedge laterally against an inner wall 14a of the female tube 14. The cooperating wedges 34, 36 thus cause the locking mechanism 32 to fix the male tube 18 lengthwise of the female tube 14.

Reversing the knob actuator 40 lengthens the rod 38 within the male tube 18 and permits the farther wedge 34 to back away from the nearer wedge 36 along the plane of contact 42. With the lengthwise force of the rod coupler 38 removed, the wedges 34, 36 return to their normal positions central of the female tube 14. The lengthwise locking mechanism 32 is thereby released, which permits selective lengthwise adjustment of the male tube 18 relative to the female tube 14 before re-engaging the locking mechanism 32.

Figure 3:
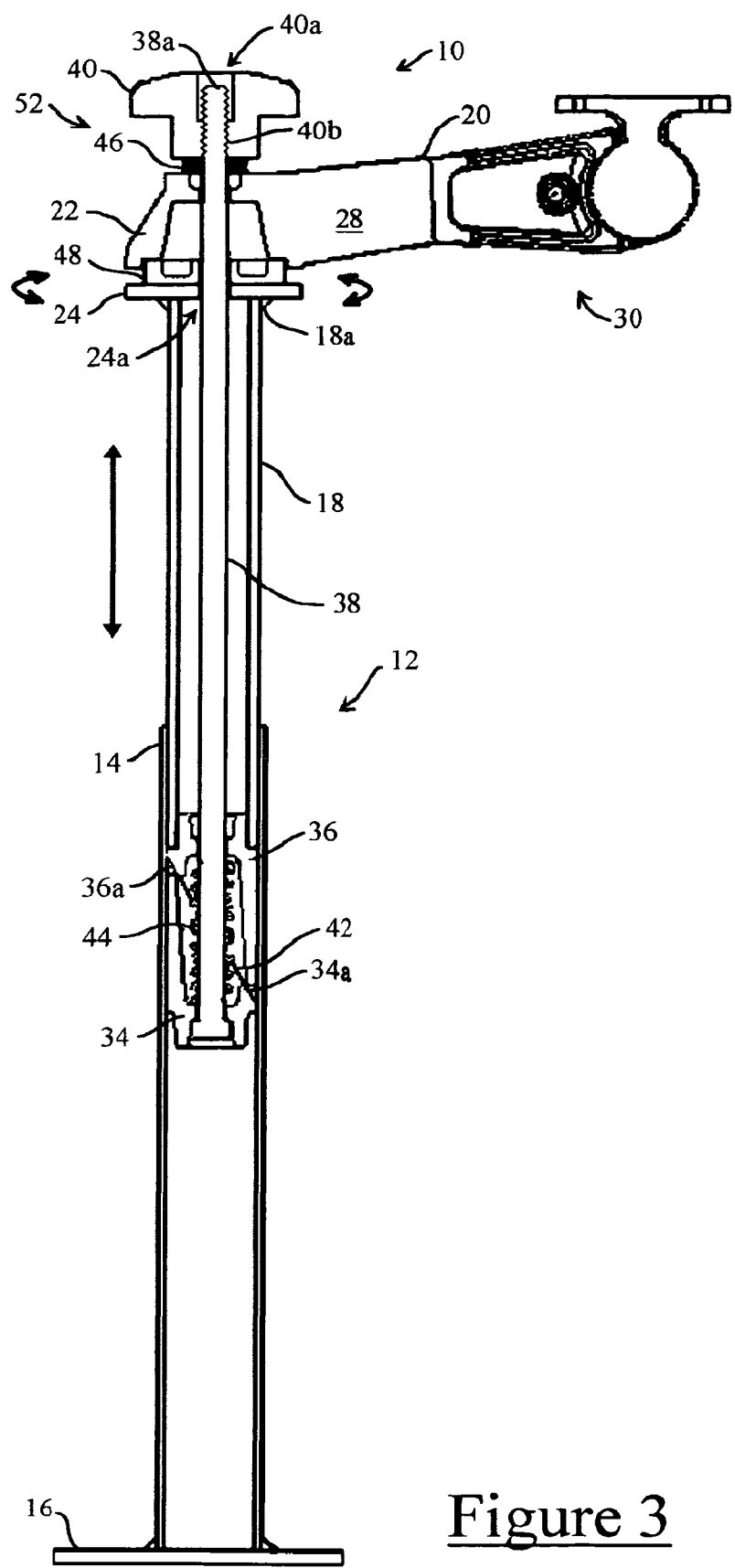
FIG. 3 is a cross sectional view of the telescoping pole mount of the invention that illustrates a male tube member being repositioned lengthwise of a female tube member.

FIG. 3 illustrates, by example and without limitation, the male tube 18 being repositioned lengthwise of the female tube 14.

Figure 4:
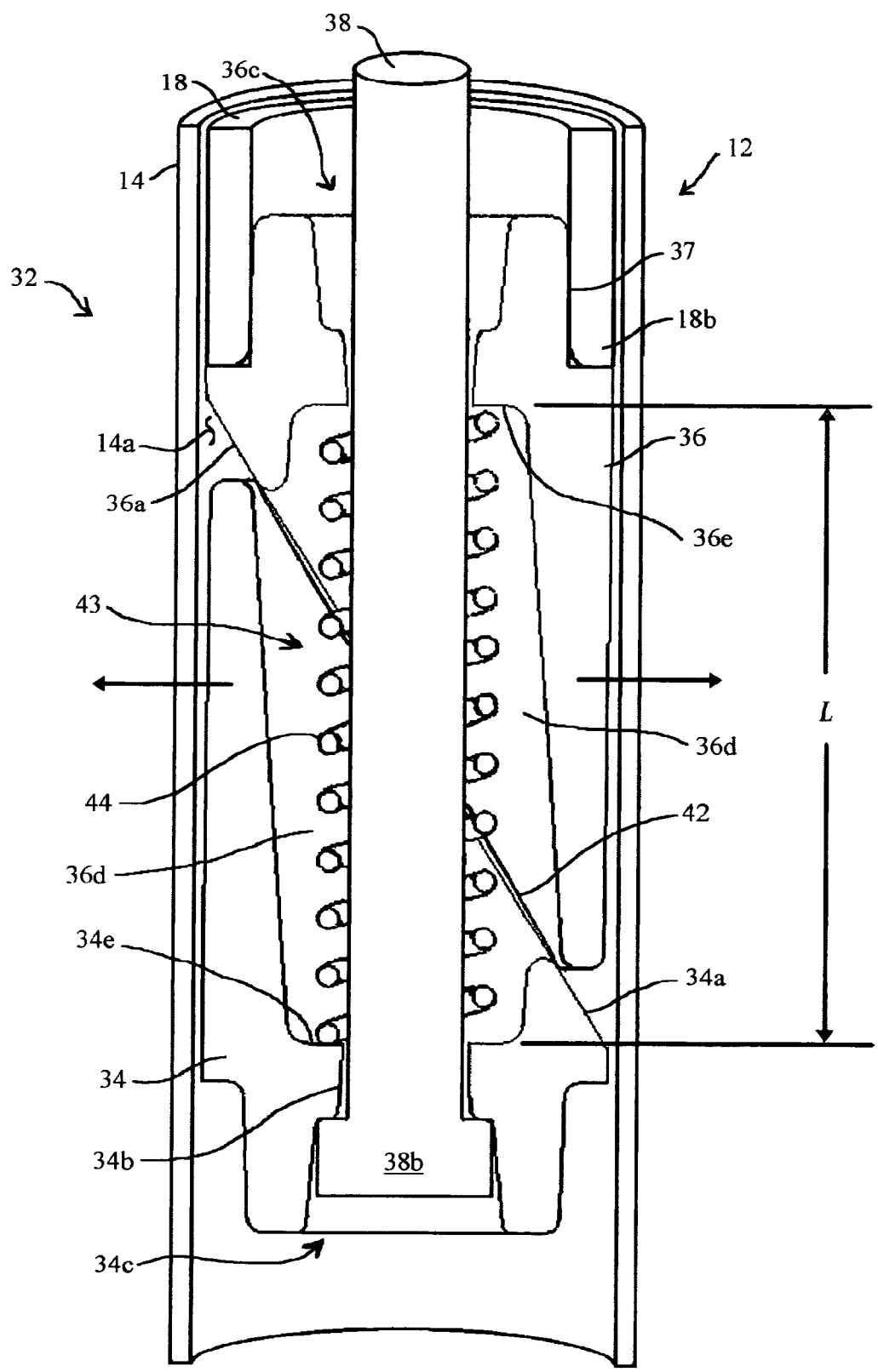
FIG. 4 is a close-up cross sectional view that illustrates one embodiment of a lengthwise locking mechanism of the invention.

FIG. 4 is a close-up view of the cooperating wedges 34, 36 of the lengthwise locking mechanism 32. A joint 37 is expected to be formed between the nearer wedge 36 and a second end 18b of the male tube 18 that remains within the female tube 14. Accordingly, the nearer wedge 36 is expected to be welded, threaded, swaged, keyed, pinned or otherwise coupled in a rotationally fixed relationship with the second end 18b of the male tube 18. By example and without limitation, the nearer wedge 36 is further formed with a lengthwise clearance passage 36b that is sized to slidingly pass the rod coupler 38 therethrough without appreciable interference and yet simultaneously substantially center the rod coupler 38 relative to both the wedge 36 and the surrounding tubes 14, 18. However, frictional forces may adequately substitute for expressly fixing the nearer wedge 36 relative to the male tube 18.

The farther wedge 34 and the rod coupler 38 are expected to be mutually structured to be rotationally fixed relative to one another. By example and without limitation, the wedge 34 is fixed to a second end 38b of the rod coupler 38 opposite from the first threaded end 38a. By example and without limitation, the farther wedge 34 is formed with a lengthwise clearance passage 34b that is sized to slidingly pass the rod coupler 38 therethrough, but is undersized relative to the oversized head 38b of the rod coupler 38. According to one embodiment of the invention, the farther wedge 34 and the oversized head 38b of the rod coupler 38 are structured in a mutually cooperative manner as to keep the rod coupler 38 from turning relative to the farther wedge 34. For example, the oversized rod head 38b is square or hex shaped and is sized to fit with a mating square or hex shaped socket 34c in the farther wedge 34 opposite from the incline surface 34a. According to one embodiment of the invention, the oversized head 38b is a nut, such as a locking nut, that is threaded onto the rod coupler 38 at the second end 38b opposite from the first end 38a. Alternatively, the wedge 34 is welded, threaded, swaged, keyed, pinned or otherwise coupled in a rotationally fixed relationship with the rod coupler 38, whereby the oversized head 38b may be eliminated. Any suitable structure for coupling the rod coupler 38 in a rotationally fixed relationship with the farther wedge 34 may be substituted without deviating from the scope and intent of the invention. Additionally, although the farther wedge 34 and the rod coupler 38 are expected to include such structure for being mutually rotationally fixed, frictional forces may adequately substitute for expressly fixing the farther wedge 34 relative to the rod coupler 38.

The nearer wedge 36 is optionally provided with a socket 36c opposite from the inclined surface 36a to be consistent with the optional identity of the two wedges 34, 36. However, as discussed above, substantial identity between the cooperating wedges 34, 36 is not necessary. Therefore, the socket 36c may be eliminated in practice of the invention.

Turning the knob actuator 40 pulls the rod coupler 38 through the male tube 18 and draws the oversized head 38b of the rod coupler 38 toward the nearer wedge 36, which in turn draws the farther cooperating wedge 34 lengthwise along the inside of the outer female tube 14 and against the nearer cooperating wedge 36. Upon contact, the respective sharply inclined surfaces 34a, 36a of the cooperating wedges 34, 36 interact along an inclined plane of contact 42. The nearer wedge 36 cannot retreat relative to the male tube 18 that is strong enough to resist the stress in the rod coupler 38. Therefore, the continued action of the knob actuator 40 through the rod coupler 38 forcefully draws the farther wedge 34 to move along the plane of contact 42 crosswise to the nearer wedge 36 and laterally of the male tube 18, as indicated by the outward pointing arrows. According to one embodiment of the invention, the cooperating wedges 34, 36 are both sized to slide within the female tube 14 with little clearance. Therefore, crosswise and lateral motion drives the cooperating wedges 34, 36 to jam and wedge against an inner wall 14a of the female tube 14. The cooperating wedges 34, 36 thus cause the locking mechanism 32 to fix the male tube 18 lengthwise of the female tube 14.

Reverse turning of the knob actuator 40 reverses the rod coupler 38 into the male tube 18 and permits the farther wedge 34 to back away from the nearer wedge 36 along the plane of contact 42. With the lengthwise tension of the rod coupler 38 thus relieved, both wedges 34, 36 return to their normal positions central of the female tube 14. The lengthwise locking mechanism 32 is thus released, which permits selective adjustment of the male tube 18 relative to the female tube 14.

According to one embodiment of the invention, one or both the female and male tubes 14, 18 are round. Accordingly, they may be mutually rotatable so the apparatus or arm 20 can be rotated about the telescoping pole 12 even if it is fixed to the external end 18a of the male tube 18. Engaging the lengthwise locking mechanism 32 additionally secures the tubes 14, 18 against mutual rotation while simultaneously fixing the length or extension of the telescoping pole 12.

According to one embodiment of the invention, the female and male tubes 14, 18 are formed with cooperating shapes, such as mating square or hex shapes, so that they are substantially restricted against mutual rotation by their cooperating shapes. Accordingly, engaging the lengthwise locking mechanism 32 merely fixes the relative lengthwise positions of the tubes 14, 18 for fixing the length or extension of the telescoping pole 12.

Re-engaging the locking mechanism 32 fixes the male tube 18 in a new position relative to the female tube 14, as illustrated by example and without limitation in FIG. 3.

Also illustrated here is one exemplary embodiment of the invention for overcoming the disengagement resistance of prior art wedge mechanisms. In prior art devices, a sharp rap or other activation must be applied to disengage prior art wedge mechanisms from their interlocked relationship because they became so effectively jammed against one another and the wall of the tubes.

According to one embodiment of the invention, a disengaging mechanism 43 is provided for disengaging the wedges 34, 36 from their interlocked relationship. As illustrated here, the disengaging mechanism 43 is embodied as a strong compression spring 44 for disengaging the wedges 34, 36, for example by pushing the farther wedge 34 away from the nearer wedge 36. For example, the compression spring 44 is positioned between the cooperating wedges 34, 36. By example and without limitation, the wedges 34, 36 are formed with respective lengthwise hollow cavities 34d, 36d that communicate with one another along the plane of contact 42. The compression spring 44 is compressed to fit into the communicating cavities 34d, 36d. The spring 44 is sized having an uncompressed length that is longer than a combined length of the communicating lengthwise cavities 34d, 36d in the respective wedges 34, 36. When the farther wedge 34 is drawn against the nearer wedge 36, the compression spring 44 is compressed within the lengthwise cavities 34d, 36d between their opposing respective floor portions 34e, 36e. However, when effectively compressed, the compressed length of the spring 44 does not interfere with engagement of the inclined wedge surfaces 34a, 36a along the plane of contact 42 and consequent lateral spreading of the wedges 34, 36 during engagement of the locking mechanism 32.

Upon relief of the lengthwise tension of the rod coupler 38, expansion spring force in the compressed spring 44 operates against the opposing floor portions 34e, 36e of the wedge lengthwise cavities 34d, 36d. The expansion spring force operates to push apart and disengage the two interacting wedges 34, 36 to release the lengthwise locking mechanism 32. The expansion force in the spring 44 is sufficiently strong that, when the tension in the lengthwise rod coupler 38 is relieved, decompression and expansion of the spring 44 overcomes the jamming force that holds the wedges 34, 36 against the inner wall 14a of the female tube 14. Disengagement from the tube inner wall 14a permits the wedges 34, 36 to return to their normal positions central of the female tube 14 where they slide freely. The lengthwise locking mechanism 32 is released, and the male tube 18 is free to be repositioned relative to the female tube 14.

Figure 5:
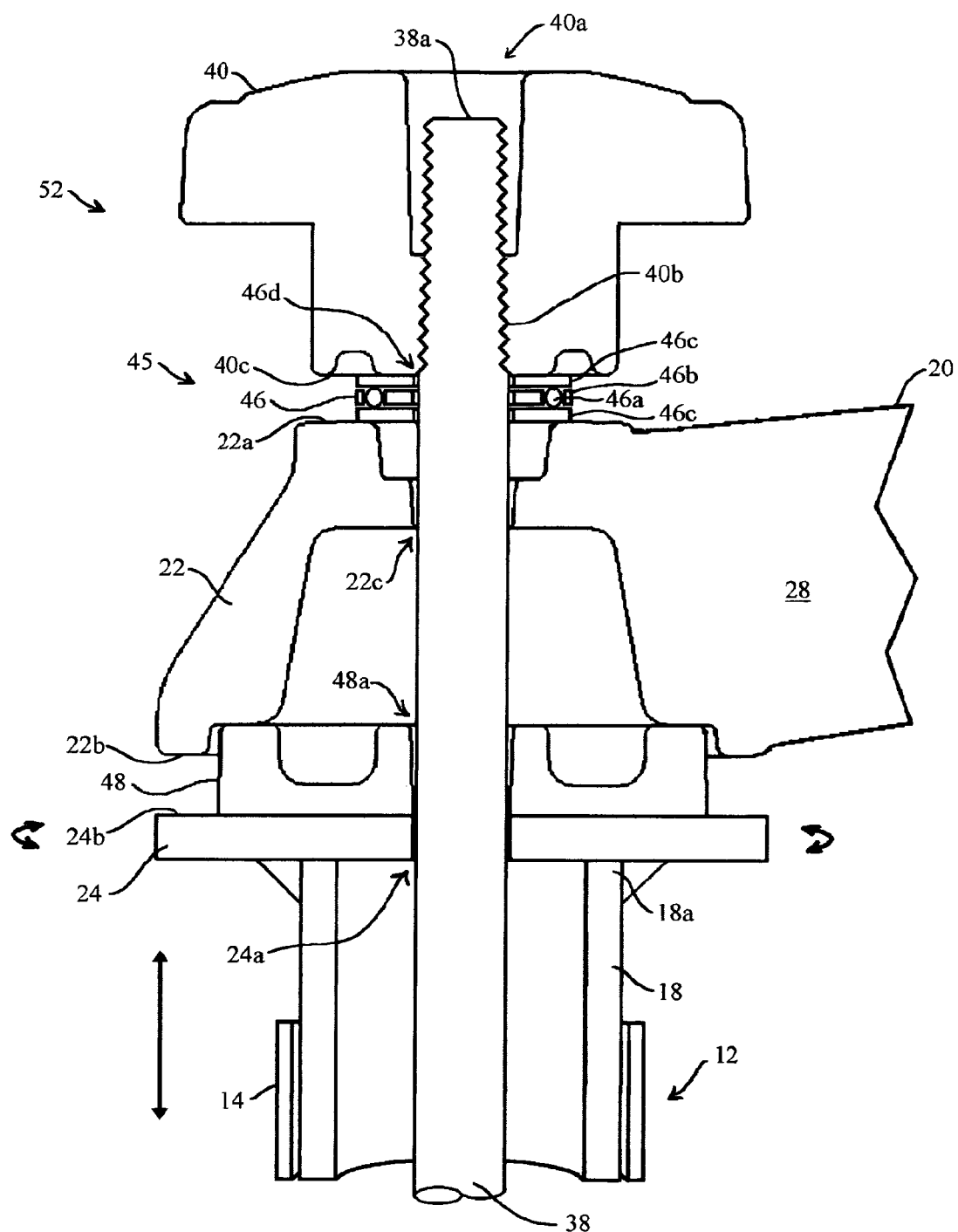
FIG. 5 is a close-up cross sectional view that illustrates one embodiment of a lengthwise drive mechanism of the invention for activating the lengthwise locking mechanism of the invention.

FIG. 5 illustrates one embodiment of a lengthwise drive mechanism 52 of the invention for drawing the rod coupler 38 through the male tube 18 and pulling the farther wedge 34 against the nearer wedge 36 along the inclined plane of contact 42. By example and without limitation, lengthwise drive mechanism 52 of the invention is provided as the knob actuator 40. According to one embodiment of the invention by example and without limitation, the knob actuator 40 is provided with a lengthwise bore 40a having an internal female thread 40b that is attached to male threads formed on the threaded end 38a of the rod coupler 38 opposite from the oversized head 38b. Alternatively, the rod coupler 38 is optionally so threaded for substantially its entire length. Turning the knob actuator 40 causes a contact surface 40c of the knob actuator 40 to act against the external platform 24 to draw the threaded rod coupler 38 through the platform 24 and pulls it through the male tube 18, as discussed herein. According to different embodiments of the invention, the knob actuator 40 alternatively works either directly against a contact surface 24b of the platform 24 (shown in subsequent Figures), or through the intervening hub 22 of the rotatable arm 20 (shown here).

The hub 22 of the rotatable arm 20 is structured to rotate about the telescoping pole 12 even while the lengthwise locking mechanism 32 is fully engaged for fixing the female and male tubes 14, 18 relative to one another. The inventor of the present invention has determined through experimentation that, without an interface structure between the threaded knob actuator 40 and the platform 24 for decoupling rotations of the rotatable arm 20 from the knob contact surface 40c, the threaded knob actuator 40 invariably loosens on the threaded rod end 38a when the arm 20 is rotated in the thread direction. Loosening of the knob actuator 40 relieves the tension in the rod coupler 38 and releases the lengthwise locking mechanism 32. The inner male tube 18 is then able to move freely within the outer female tube 14. Such loosening of the threaded knob actuator 40 and consequent release of the lengthwise locking mechanism 32 defeats the purpose of structuring the mechanical arm 20 to rotate about the telescoping pole 12.

By example and without limitation, one exemplary embodiment a decoupling mechanism 45 of the invention is illustrated for decoupling rotation of the rotatable mechanical arm 20 from the actuator knob's contact surface 40c and thereby overcoming the loosening of the lengthwise locking mechanism 32. A thrust bearing 46 is installed to interface between the contact surface 40c of the threaded knob actuator 40 and the contact surface 24b of the platform 24. When the rotatable mechanical arm 20 is installed between the threaded knob actuator 40 and platform 24, as shown, the thrust bearing 46 is interfaced between the actuator knob's contact surface 40c and a first contact surface 22a of the presentation platform's hub 22. The thrust bearing 46 decouples the rotational drive of the hub's contact surface 22a from the actuator knob's contact surface 40c. The thrust bearing 46 thus permits the hub 22 to rotate in either direction about the telescoping pole 12 without affecting the firmly threaded relationship between the rod end 38a and the threaded knob actuator 40. The thrust bearing 46 is, by example and without limitation, any form of conventional thrust bearing, including a pin thrust bearing, a roller thrust bearing, and a ball thrust bearing. For example, the thrust bearing 46 is structured of a quantity of hardened pins, rollers or balls 46a evenly distributed within a cage 46b between a pair of smooth plates or washers 46c. The washers 46c interface with the different contact surfaces 22a, 40c of the hub 22 and knob actuator 40, respectively. The hardened pins, rollers or balls 46a interface between the opposing washers 46c. According to one embodiment of the invention, the thrust bearing 46 includes a clearance passage 46d central of the cage 46b and washers 46c that admits passage of the threaded rod coupler 38 therethrough and that simultaneously serves to center the thrust bearing 46 within its space between the hub 22 and the threaded knob actuator 40 and to retain it in position during operation.

The thrust washer 46 has been determined to support any load that can be generated between the respective hub and knob interface surfaces 22a and 40c. Intervention of the thrust washer 46 has been determined to effectively decouple rotations of the rotatable mechanical arm 20 from the knob contact surface 40c such that the threaded knob actuator 40 invariably retains its threaded relationship with the threaded rod end 38a when the mechanical arm 20 is rotated in any direction, including the thread direction. The novel thrust bearing 46 interfaced between the actuator knob's contact surface 40c and the hub's contact surface 22a thus permits relative rotation of the mechanical arm 20, while the integrity of the threaded relationship between the rod end 38a and knob actuator 40 is maintained and effectiveness of the locking mechanism 32 remains uncompromised.

An optional bushing 48 may be interfaced between a second opposite contact surface 22b of the hub 22 portion of the rotatable mechanical arm 20 and the stationary platform's contact surface 24b for easing rotation of the mechanical arm 20 relative to the platform 24. For example, the bushing 48 is formed in a thick washer shape having a central passage 48a for clearance of the rod coupler 38. The bushing 48 is formed of a conventional material, such as nylon, Teflon®, or Delrin®, or another bushing material. Alternatively, another thrust bearing 46 is substituted for the bushing 48 between the hub's second contact surface 22b and the platform's contact surface 24b.

Alternatively, a bushing formed of a non-conventional bushing material is substituted for the bushing 48. Such non-conventional bushing material is a low durometer "spongy" material, whereby the bushing 48 is substantially resiliently compressible. Furthermore, the non-conventional low durometer bushing material also has a "sticky" surface with a high coefficient of friction. Accordingly, the low durometer material causes bushing 48 to resiliently compress between the hub 22 and the platform's contact surface 24b, while the high coefficient of friction surface causes bushing 48 to stick therebetween so that the mechanical arm 20 is frictionally constrained from rotation relative to the platform 24.

Also illustrated is a clearance passage 22c through the hub 22 that is sized to pass the threaded rod coupler 38 and thereby retain alignment of the rotatable mechanical arm 20 relative to the telescoping pole 12 during rotation thereabout.

Figure 6:
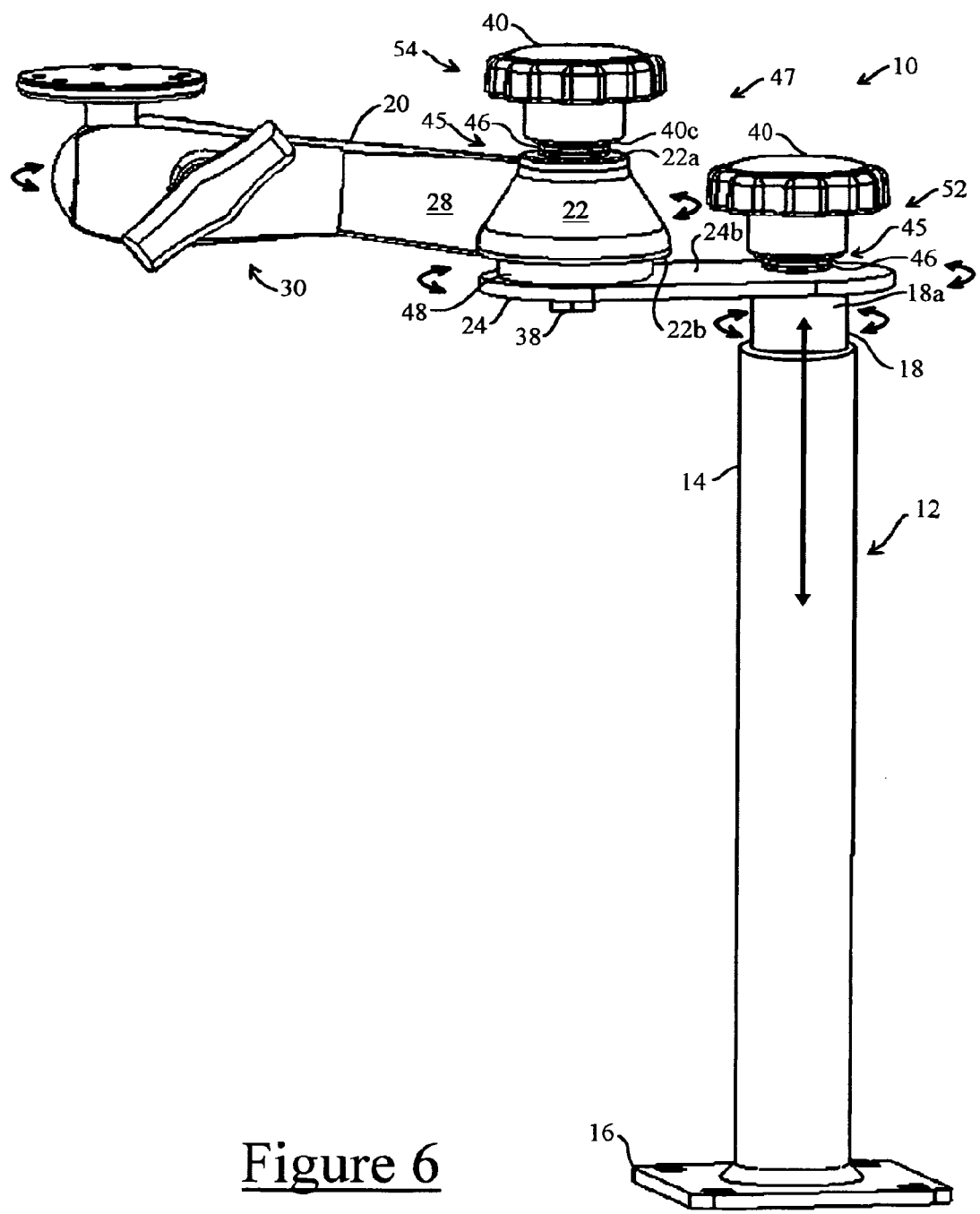
FIG. 6 is a perspective view that illustrates by example and without limitation one alternative embodiment of the telescoping pole of the present invention having a double arm mechanism.

FIG. 6 illustrates the telescoping pole 12 of the present invention alternatively embodied as having a first one of the threaded knob actuators 40 alternatively positioned to work against the platform 24, without intervention of the rotatable mechanical arm 20, for operating the lengthwise locking mechanism 32 and thereby fixing the elevation of the telescoping pole 12. Here the male tube 18 and the optionally stationary platform 24 fixed on its exterior end 18a together can be rotated relative to the telescoping pole 12 while the locking mechanism 32 is relaxed, when one or both of the tubes 14, 18 are round. However, when the locking mechanism 32 is engaged, the optionally stationary platform 24 is fixed to the male tube 18 so that it is not rotatable relative to the telescoping pole 12, as contrasted with the rotation of the mechanical arm 20 relative to the platform 24. Therefore, only a common flat washer 50 is provided for interfacing between the first knob actuator's contact surface 40c and the platform's contact surface 24b for easing turning of the knob actuator 40. According to one embodiment of the invention, the decoupling mechanism 45 of the invention is optionally interfaced between the first actuator knob's contact surface 40c and the stationary platform's contact surface 24b for further easing turning of the knob actuator 40. For example, either the thrust bearing 46 or bushing 48 is optionally interfaced between the first actuator knob's contact surface 40c and the stationary platform's contact surface 24b. However, the thrust bearing 46 and bushing 48 interfaces are unnecessary because the platform 24 is fixed to the male tube 18 so that it is not rotatable relative to the telescoping pole 12 as contrasted with the rotation of the rotatable mechanical arm 20 relative to the platform 24. Therefore, no opportunity is presented for loosening the knob actuator 40 on the threaded rod end 38a through rotation of the intervening platform 24.

As illustrated here, the platform 24 is enlarged relative to embodiments illustrated in previous figures, and the rotatable mechanical arm 20 is positioned remotely from the telescoping pole 12. When the telescoping pole 12 has been extended to a selected elevation and fixed by operation of the lengthwise locking mechanism 32, as detailed in subsequent figures, the mechanical arm 20 is rotatable relative to the enlarged platform 24 at its remote position from the telescoping pole 12. A lengthwise clamping mechanism 54 fixes the rotatable hub 22 firmly against the platform 24 so that the rotatable mechanical arm 20 neither tips nor wobbles when loaded, yet the mechanical arm 20 is fully rotatable relative to the platform 24. According to one embodiment of the invention, the lengthwise clamping mechanism 54 includes a second decoupling mechanism 45 of the invention for decoupling rotation of the rotatable mechanical arm 20 and thereby overcoming the loosening of the lengthwise clamping mechanism 54.

Optionally, another bushing 48 may be interfaced between the second opposite contact surface 22b of the hub 22 of the rotatable mechanical arm 20 and the stationary platform's contact surface 24b for easing rotation of the mechanical arm 20 relative to the platform 24.

According to one embodiment of the invention, the platform 24 is rotatable relative to the end 18a of the male tube 18. Therefore, the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. According to this embodiment of the invention, the external end 18a of the male tube 18 is substantially planar such that the platform 24 slides on the tube end 18a for being rotated about the telescoping pole 12. The rotatability of the platform 24 causes the rotatable apparatus or mechanical arm to be formed of two parts: an inner arm 24 and the outer arm 20, together a double arm mechanism 47. In other words, the double arm mechanism 47 is formed by inner arm platform 24 and outer arm 20 that operate as respective upper arm and forearm of the human anatomy and are interconnected by an elbow joint that is represented by the hub 22 of the outer arm 20 that is rotatable relative to the enlarged platform 24 at its remote position from the telescoping pole 12. The shoulder joint is represented by the enlarged platform 24 that is rotatable relative to the male tube 18 at the end of the telescoping pole 12. A hand portion of the two-part mechanical arm is represented by, for example, the ball and socket mounting apparatus 30 of the type described in U.S. Pat. No. 5,845,885.

Figure 7:
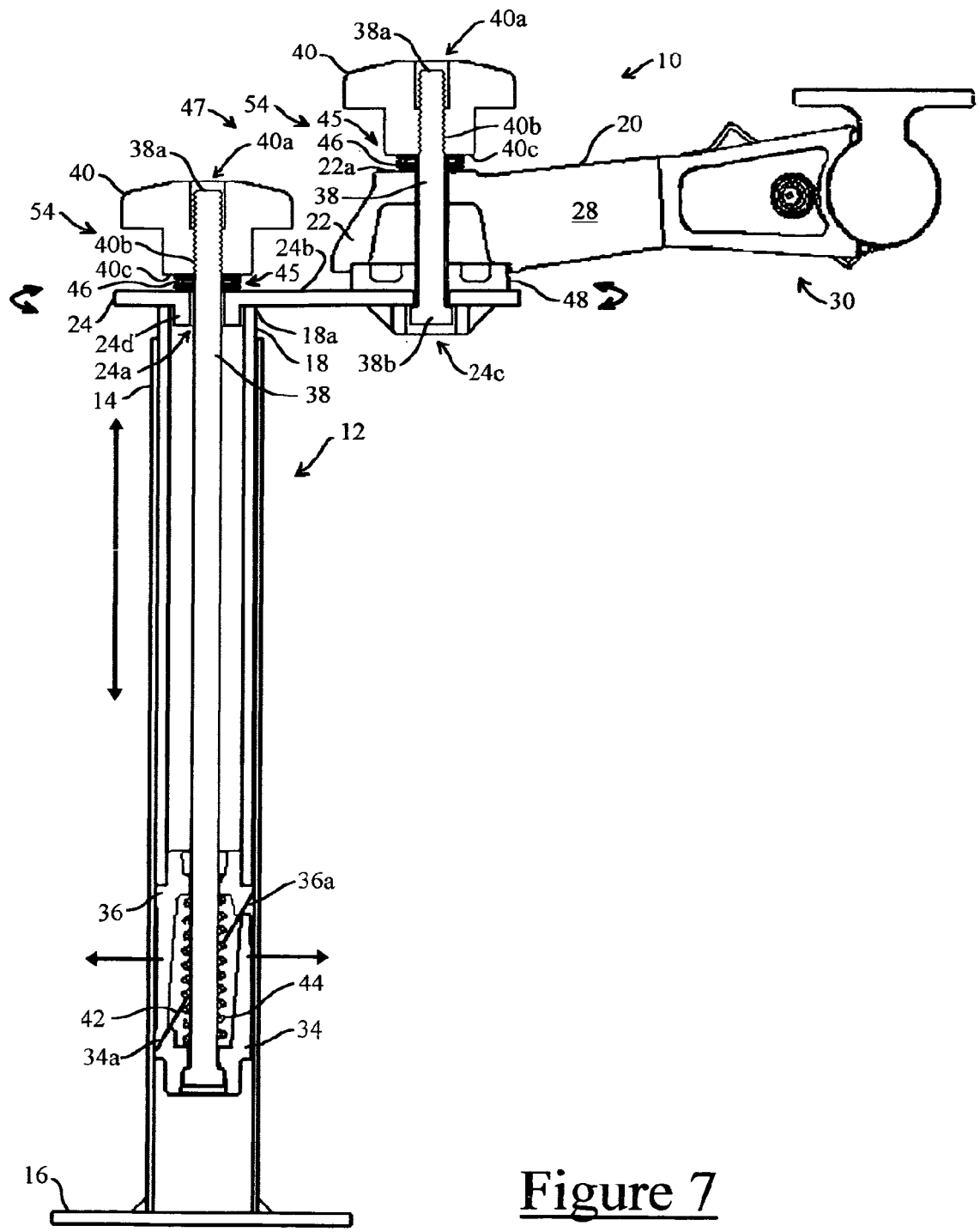
FIG. 7 is a cross sectional view that illustrates an alternative embodiment of the lengthwise locking mechanism of the invention.

FIG. 7 illustrates an alternative embodiment of the lengthwise locking mechanism 32 having the knob actuator 40 operating against the enlarged stationary or optionally rotatable platform 24. Optionally, the thrust bearing 46 (shown) or the bushing 48 may be interfaced between the first actuator knob's contact surface 40c and the stationary platform's contact surface 24b for easing turning of the first knob actuator 40 for engaging the cooperating wedges 34, 36 of the lengthwise locking mechanism 32. The lengthwise locking mechanism 32 operates as discussed herein.

Also illustrated is the lengthwise clamping mechanism 54 for fixing the rotatable hub 22 firmly against the platform 24 so that the rotatable mechanical arm 20 neither tips nor wobbles when loaded, yet permits the mechanical arm 20 to rotate fully relative to the platform 24.

According to one embodiment of the invention, the lengthwise clamping mechanism 54 that fixes the rotatable hub 22 firmly against the platform 24, and simultaneously permits the mechanical arm 20 to rotate fully relative to the platform 24 is embodied as a second coupler 38 in cooperation a second actuator 40. A second decoupling mechanism 45 of the invention is interfaced between the second actuator knob 40 and the rotatable arm 20 for decoupling rotation of the rotatable mechanical arm 20 from the second actuator knob's contact surface 40c and thereby overcoming the loosening of the lengthwise clamping mechanism 54. For example, a second thrust bearing 46 is interfaced between the second actuator 40 and the hub 22 of the rotatable arm 20. The second coupler 38 is extended beyond the enlarged platform 24 remotely from the telescoping pole 12.

The mechanical arm 20 is rotatable relative to the enlarged platform 24 by the second coupler 38 passing through the hub 22. The second actuator 40 is, for example, a second knob that is threaded onto a threaded end 38a of the second coupler 38 for securing the hub 22 in such manner as to permit the mechanical arm 20 to rotate about the second coupler 38 relative to the enlarged platform 24. According to one embodiment of the invention, the second decoupling mechanism 45 of the invention is embodied as the second thrust bearing 46 that is interfaced between the second knob actuator's contact surface 40c and the first contact surface 22a of the hub 22. The second thrust bearing 46 effectively decouples the rotational drive of the hub's contact surface 22a from the second knob actuator's contact surface 40c, which permits the hub 22 to rotate in either direction about the second coupler 38 without affecting the threaded relationship between the threaded end 38a of the second coupler 38 and the second knob actuator 40, i.e., without loosening the second knob actuator 40 on the second coupler 38 when the hub 22 is rotated in the thread direction.

According to one embodiment of the invention, the platform 24 and the remote rotatable mechanical arm 20 together form respective inner and outer portions of the double arm mechanism 47. The platform 24 is thus rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the end 18a of the male tube 18, it is optionally formed with a spud 24d for alignment with the male tube 18. The clearance hole 24a is sufficient to maintain the coupler 38 in substantial alignment with the platform 24 and the male tube 18 of the telescoping pole 12.

Figure 8:
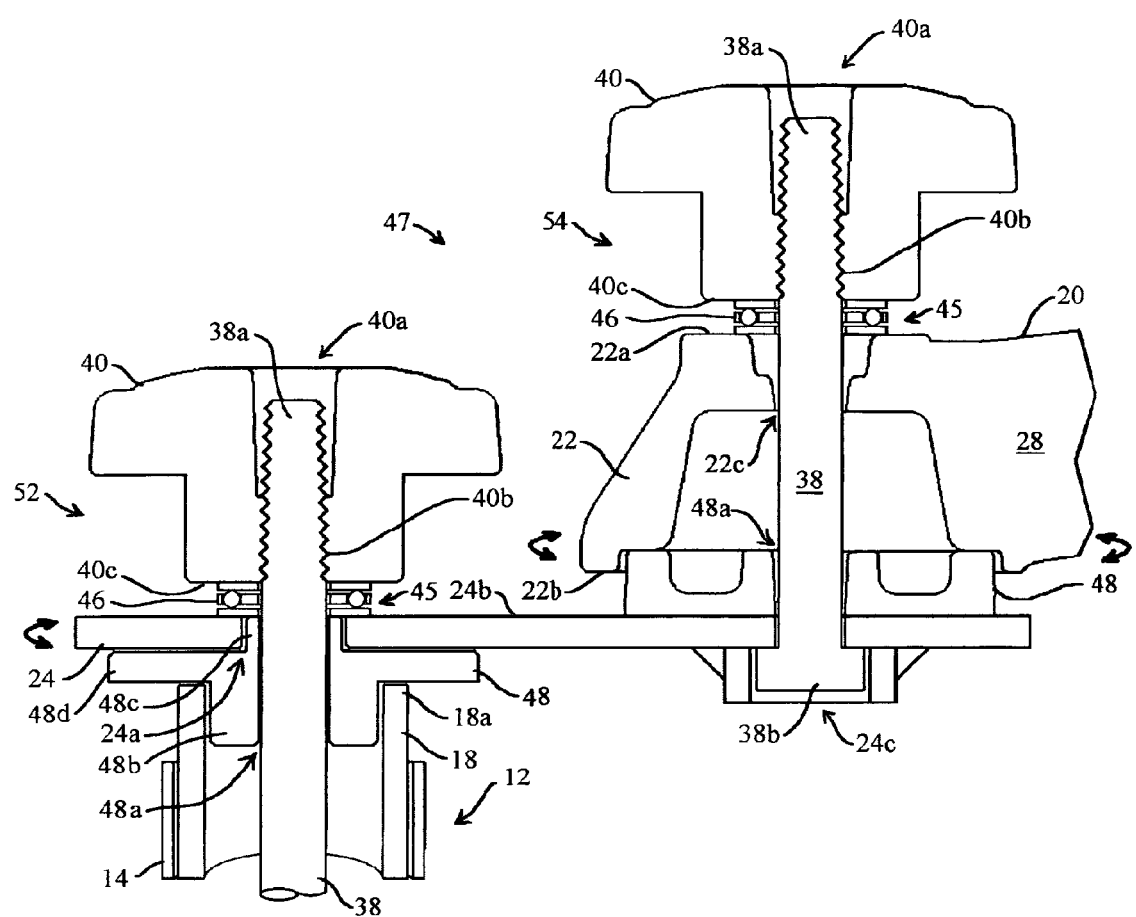
FIG. 8 is a close-up cross sectional view that illustrates one embodiment of the lengthwise drive mechanism of the invention of the invention.

FIG. 8 illustrates one embodiment of the lengthwise drive mechanism 52 of the invention of the invention for drawing the length of the rod coupler 38 through the male tube 18 for pulling the farther wedge 34 against the nearer wedge 36 along the inclined plane of mutual contact 42. By example and without limitation, turning the threaded knob actuator 40 causes the knob actuator's contact surface 40c to act against the contact surface 24b of the external platform 24 for drawing the rod coupler 38 through the platform 24 and progressively drawing it through the male tube 18, as discussed herein. According to different embodiments of the invention, the knob actuator 40 alternatively works either directly against a contact surface 24b of the platform 24 (shown here), or through the intervening hub 22 of the mechanical arm 20 (shown in previous Figures). Optionally, the decoupling mechanism 45 of the invention is included as part of the lengthwise drive mechanism 52 for easing rotation of the threaded knob actuator 40 relative to the contact surface 24b of the platform 24. For example, the thrust washer 46 optionally interfaces between the knob actuator's contact surface 40c and the stationary platform's contact surface 24b. Optionally, the bushing 48 may be interfaced between the knob actuator's contact surface 40c and the stationary platform's contact surface 24b for easing rotation of the threaded knob actuator 40 relative to the platform's contact surface 24b.

The platform 24 is optionally stationary relative to the end 18a of the male tube 18.

According to one embodiment of the invention, the platform 24 and the remote rotatable mechanical arm 20 together form respective inner and outer portions of the double arm mechanism 47. Accordingly, the platform 24 is rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the male tube 18, the bushing 48 is optionally interfaced between the platform 24 the male tube end 18a. The bushing 48 is optionally formed with a spud 48b for alignment with the male tube 18, while the clearance hole 48a is sufficient to maintain the coupler 38 in substantial alignment with the platform 24 and the male tube 18 of the telescoping pole 12. A sleeve portion 48c of the bushing within the clearance hole 24a decouples rotations of the platform 24 from the coupler 38, while a flange portion 48d decouples the rotations of the platform 24 from the end 18a of the male tube 18.

Also illustrated here is the lengthwise clamping mechanism 54 for fixing the rotatable hub 22 firmly against the platform 24 at a remote location from the telescoping pole 12 so that the rotatable mechanical arm 20 neither tips nor wobbles when loaded, yet the mechanical arm 20 is fully rotatable relative to the platform 24.

According to one embodiment of the invention, the lengthwise clamping mechanism 54 includes the second bolt or threaded rod coupler 38 in cooperation the second threaded knob actuator 40. The second decoupling mechanism 45 of the invention is interfaced between the second knob actuator 40 and the hub 22 of the rotatable arm 20. By example and without limitation, the second decoupling mechanism 45 of the invention is provided as the second thrust bearing 46 that is interfaced between the second knob actuator 40 and the hub 22 of the rotatable arm 20. The threaded end 38a of the second coupler 38 is extended beyond the contact surface 24b of the enlarged platform 24 at a position located remotely, i.e., spaced away, from the telescoping pole 12.

According to one embodiment of the invention, the oversized head 38b of the second coupler 38 and a remote portion of the enlarged platform 24 are structured in a mutually cooperative manner as to keep the second coupler 38 from turning relative to the platform 24. For example, the second coupler 38 is a conventional bolt having an enlarged square or hex shaped head 38b that is sized to fit with a mating square or hex shaped socket 24c in the platform 24 opposite from the contact surface 24b. According to one embodiment of the invention, the second coupler 38 is a rod threaded substantially its entire length and the oversized head 38b is a nut, such as a locking nut, that is threaded onto the second coupler 38 at the second end 38b opposite from the first threaded end 38a. Alternatively, the enlarged platform 24 is welded, threaded, swaged, keyed, pinned or otherwise coupled in a rotationally fixed relationship with the second coupler 38, whereby the oversized head 38b may be eliminated. Any suitable structure for coupling the second coupler 38 in a rotationally fixed relationship with the enlarged platform 24 may be substituted without deviating from the scope and intent of the invention. Additionally, although the enlarged platform 24 and the second coupler 38 are expected to include such structure for being mutually rotationally fixed, frictional forces may adequately substitute for expressly fixing the second coupler 38 relative to the enlarged platform 24.

The hub 22 of the rotatable mechanical arm 20 is structured to rotate relative to the enlarged platform 24 even while the lengthwise clamping mechanism 54 is fully engaged for clamping the rotatable arm 20 firmly to the platform 24. According to one embodiment of the invention, the hub 22 of the mechanical arm 20 is formed with the clearance passage 22c that is sized to pass the second bolt or rod coupler 38. The second knob actuator 40 is firmly threaded to the threaded end 38b of the second coupler 38 and thereby retains the rotatable mechanical arm 20 in firm contact with the contact surface 24b of the enlarged platform 24 even during rotation thereabout.

The inventor of the present invention has determined through experimentation that, without an interface structure between the second threaded knob actuator 40 and the platform 24 for decoupling rotations of the mechanical arm 20 from the second actuator knob's contact surface 40c, the second threaded knob actuator 40 invariably loosens on the threaded coupler end 38a when the arm 20 is rotated in the thread direction. Loosening of the second threaded knob actuator 40 relieves the tension in the second coupler 38 and releases the lengthwise clamping mechanism 54. The rotatable mechanical arm 20 is then able to tip and wobble freely relative to the platform 24. Such loosening of the second threaded knob actuator 40 and consequent release of the lengthwise clamping mechanism 54 defeats the purpose of structuring the mechanical arm 20 to rotate about the second coupler 38.

By example and without limitation, the second decoupling mechanism 45 of the invention is provided for decoupling rotation of the rotatable mechanical arm 20 from the second actuator knob's contact surface 40c and thereby overcoming the loosening of the lengthwise clamping mechanism 54. The second decoupling mechanism 45 of the invention is provided as the second thrust bearing 46 which is installed to interface between the contact surface 40c of the second knob actuator 40 and the first contact surface 22a of the rotatable presentation platform's hub 22. The second thrust bearing 46 decouples the rotational drive of the hub's contact surface 22a from the second actuator knob's contact surface 40c. The thrust bearing 46 thus permits the hub 22 to rotate in either direction about the second coupler 38 without affecting the firmly threaded relationship between the second coupler's threaded end 38a and the second threaded knob actuator 40. The thrust bearing 46 is, by example and without limitation, any form of conventional thrust bearing, including a pin thrust bearing, a roller thrust bearing, and a ball thrust bearing, as discussed herein, with the central clearance passage 46d fit over the second coupler 38, which simultaneously serves to center the second thrust bearing 46 within its space between the hub 22 and the second threaded knob actuator 40 and to retain it in position during operation.

The thrust bearing 46 has been determined to support any practical load that can be generated between the respective hub and second knob interface surfaces 22a and 40c. Intervention of the second thrust bearing 46 has been determined to effectively decouple rotations of the rotatable mechanical arm 20 from the second knob contact surface 40c such that the second threaded knob actuator 40 invariably retains its threaded relationship with the threaded end 38a of the second coupler 38 when the mechanical arm 20 is rotated in any direction, including the thread direction. The novel interfacing of the second thrust bearing 46 between the second actuator knob's contact surface 40c and the hub's contact surface 22a thus permits relative rotation of the mechanical arm 20, while the integrity of the threaded relationship between the threaded end 38a of the second coupler 38 and the second threaded knob actuator 40 is maintained and effectiveness of the clamping mechanism 54 remains uncompromised.

Optionally, the bushing 48 may be interfaced between the second contact surface 22b of the hub 22 portion of the rotatable mechanical arm 20 and the stationary platform's contact surface 24b for easing rotation of the mechanical arm 20 relative to the platform 24. Alternatively, another thrust bearing 46 is substituted for the bushing 48 between the hub's second contact surface 22b and the platform's contact surface 24b.

Figure 9:
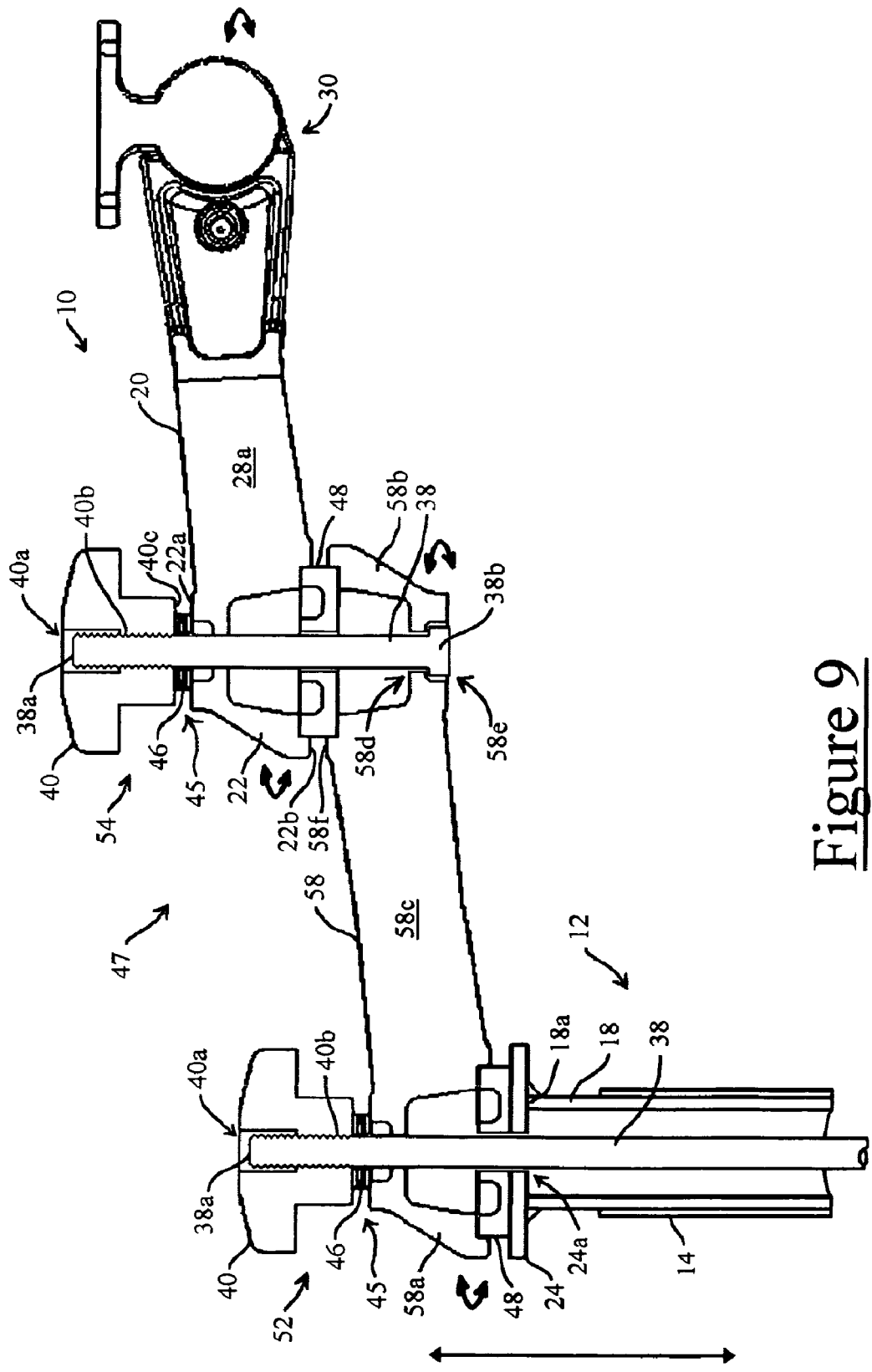
FIG. 9 is a close-up cross sectional view that illustrates one alternative embodiment of the telescoping pole of the present invention having a double arm mechanism.

FIG. 9 illustrates an alternative embodiment of the telescoping pole mount 10 having the double arm mechanism 47. As illustrated here, the double arm mechanism 47 is formed of the remote rotatable mechanical arm 20 together with a second inner mechanical arm 58 that is rotatable relative to the end 18a of the male tube 18. The second mechanical arm 58 is formed with a hub 58a that is substantially the same as the hub 22 of the arm 20 illustrated in earlier Figures and operates substantially the same. Optionally, the bushing 48 may be interfaced between the hub 58a and the platform 24 for easing rotation of the arm 58 about the telescoping pole 12. The mechanical arm 58 includes a second substantially identical hub 58b that is spaced remotely from the pole 12 by an arm extension 58c that interconnects the remote hub 58b to the hub 58a at the pole 12. The remote rotatable mechanical arm 20 is coupled for rotation relative to the inner arm's second hub 58b by the lengthwise clamping mechanism 54 that fixes the remote arm's rotatable hub 22 firmly against the inner arm's second hub 58b. By example and without limitation, the second coupler 38 operates in cooperation the second actuator 40 to rotatably couple the two hubs 22 and 58b. The second coupler 38 is coupled through the clearance passage 22c through the remote hub 22 and a similar clearance passage 58d through the inner arm's second hub 58b.

According to one embodiment of the invention, the oversized head 38b of the second coupler 38 and inner arm's second hub 58b are structured in a mutually cooperative manner as to keep the second coupler 38 from turning relative to the inner arm's second hub 58b. For example, the second coupler 38 is a conventional bolt having an enlarged square or hex shaped head 38b that is sized to fit with a mating square or hex shaped socket 58e in the hub 58b opposite from a contact surface 58f of the hub 58b. According to one embodiment of the invention, the bushing 48 is optionally interfaced between the second opposite contact surface 22b of the remote hub 22 portion of the remote mechanical arm 20 and the contact surface 58f of the inner arm's second hub 58b for easing rotation of the remote mechanical arm 20.

A second decoupling mechanism 45 of the invention is interfaced between the second actuator knob 40 and the remote hub 22 for decoupling rotation of the remote mechanical arm 20 from the second actuator knob's contact surface 40c, thereby overcoming the loosening of the lengthwise clamping mechanism 54. For example, a second thrust bearing 46 is interfaced between the second actuator 40 and the hub 22 of the remote rotatable mechanical arm 20.

FIG. 10 illustrates another alternative embodiment of the disengaging mechanism 43 of the invention for disengaging the wedges 34, 36 from their interlocked relationship upon relief of the lengthwise tension of the threaded rod coupler 38. As illustrated here, the disengaging mechanism 43 is embodied as strong tension spring 56 for disengaging the wedges 34, 36 by pulling the farther wedge 34 away from the nearer wedge 36. As illustrated here, the tension spring 56 is positioned between the farther wedge 34 and an extension 34h of the nearer wedge 36 that is extended opposite from the inner male tube 18 beyond the farther wedge 34. By example and without limitation, the wedges 34, 36 are formed with opposing connectors 34i, 36i with the tension spring 56 stretched therebetween. The tension spring 56 is sized having an unstretched length that is shorter the spacing between the opposing connectors 34i, 36i such that the tension spring 56 must be stretched to fit between the opposing connectors 34i, 36i when the farther wedge 34 is drawn against the nearer wedge 36. Upon relief of the lengthwise tension of the threaded rod coupler 38, the tension spring force in the stretched spring 56 operates against the opposing connectors 34i, 36i of the wedges 34, 36 for pulling apart and disengaging the two interacting wedges 34, 36 to release the lengthwise locking mechanism 32. The tension spring 56 is sufficiently strong that, when the tension in the lengthwise rod coupler 38 is relieved, retraction of the stretched spring 56 overcomes the jamming force that holds the wedges 34, 36 against the inner wall 14a of the female tube 14.

The respective lengthwise hollow cavities 34d, 36d are irrelevant, except as means for lightening the wedges 34, 36 by removing unnecessary material.

Figure 12:
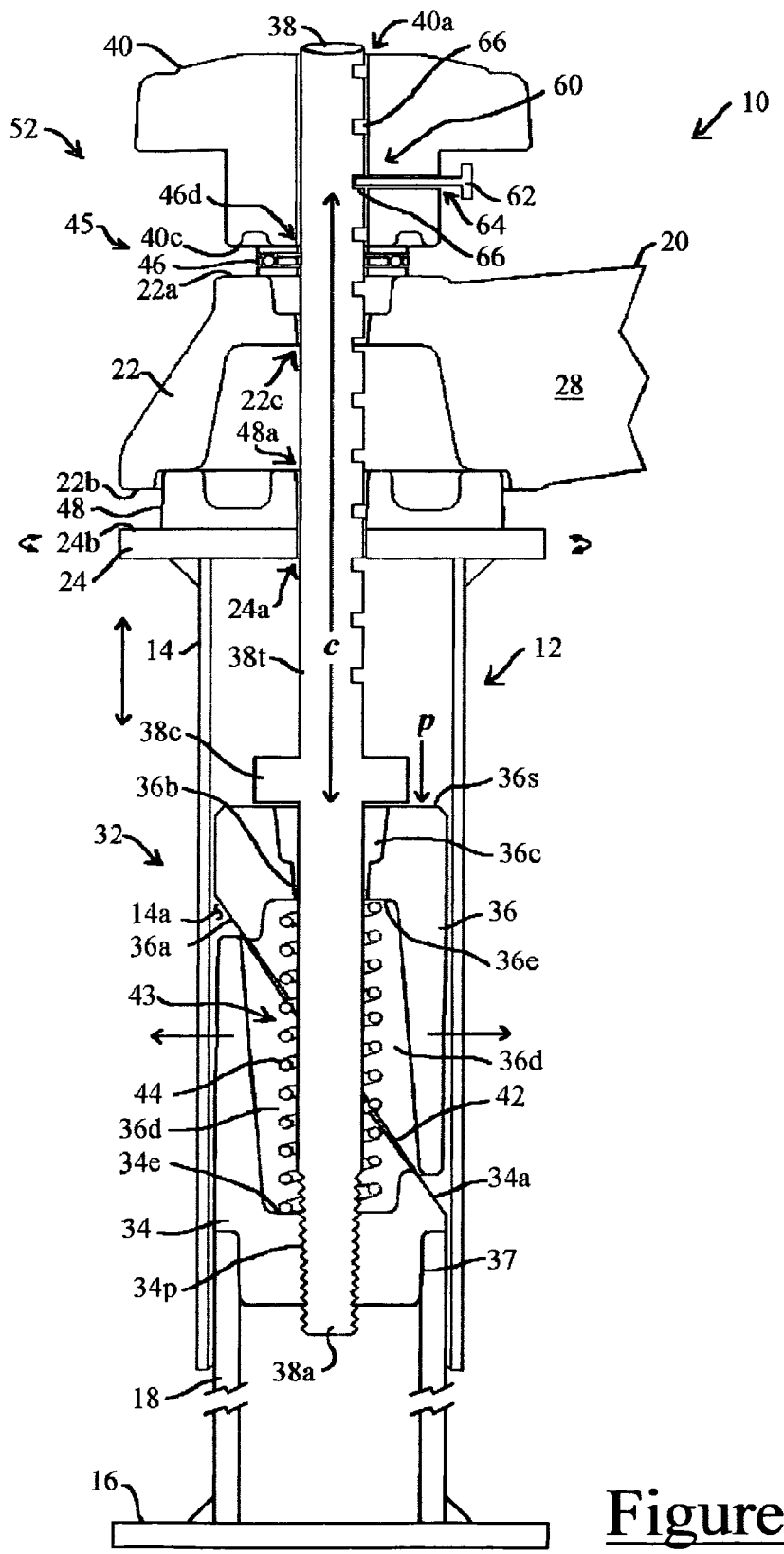
FIG. 12 cross sectional view that illustrates one alternative embodiment of the telescoping pole mount of the invention having an alternative embodiment of the lengthwise locking mechanism.

FIG. 12 illustrates one alternative embodiment of the telescoping pole mount 10 of the invention wherein the relative positions of the female and male tubes 14, 18 are reversed, with the male tube 18 being coupled to the base plate 16 and the female tube 14 being coupled to the platform 24. An alternatively embodiment of the lengthwise locking mechanism 32 is illustrated wherein the coupler 38 is reversed with its threaded end 38a inside the pole 12. The threaded end 38a of the reversed coupler 38 passes through the lengthwise clearance passage 36b in the nearer wedge 36 and is threaded into a lengthwise threaded passage 34p that is substituted for the lengthwise clearance passage 34b through the farther wedge 34. The farther wedge 34 is expected to be fixed to the male tube 18 by the joint 37. Accordingly, the farther wedge 34 is expected to be welded, threaded, swaged, keyed, pinned or otherwise coupled in a rotationally fixed relationship with the male tube 18. The coupler 38 is further formed with an enlarged boss 38c spaced along its trunk 38t from the threaded end 38a. The boss 38c and the nearer wedge 36 are structured in a mutually cooperative manner as to permit the coupler 38 to turn relative to the nearer wedge 36.

For example, the boss 38c is nearer wedge 36 relative to the socket 36c in the nearer wedge 36 as to be able to turn against a substantially planar aft surface 36s of nearer wedge 36 opposite from the incline surface 36a. Thus, the coupler 38 is able to pass partially through the nearer wedge 36 and turn within it, but the boss 38c forces the nearer wedge 36 against the farther wedge 34 by pushing against its aft surface 36s, as indicated by the arrow p. Alternatively, the boss 38c fits into and rotates within the socket 36c. Turning the coupler 38 in a first direction drives its threaded end 38a deeper through the threaded passage 34p in the farther wedge 34, which simultaneously forces the nearer and farther wedges 34, 36 together along their inclined plane of mutual contact 42. The cooperating wedges 34, 36 are thus forced to move crosswise to one another and laterally of the female tube 14, as indicated by the outwardly pointing arrows. As discussed herein, this relative crosswise motion drives the cooperating wedges 34, 36 to jam and wedge laterally against an inner wall 14a of the female tube 14. The cooperating wedges 34, 36 thus cause the locking mechanism 32 to fix the male tube 18 lengthwise of the female tube 14.

The trunk 38t of the coupler 38 slides through the lengthwise bore 40a in the knob actuator 40 that is extended to eliminate the internal female thread 40b. The threaded joint between the coupler 38 and actuator 40 is replaced by a temporary joint 60 for varying an effective length c of the coupler 38. By example and without limitation, the temporary joint 60 is formed by a pin 62 passing through a threaded or clearance (shown) passage 64 in the actuator 40 and into one of a series of holes 66 formed into the coupler 38 at intervals along the trunk 38t. Other structures are also contemplated for the temporary joint 60 and may be substituted without deviating from the scope and intent of the invention.

Mounting Platforms

FIGS. 13 and 14 are each cross sectional views that illustrate the invention embodied as an anchor mounting platform 100 for various vehicle-mounted, after-market accessory devices, such as a portable computer, satellite radio receiver, a cellular telephone, a global positioning system (GPS) receiver, or another useful accessory device. The novel anchor mounting platform 100 is mounted in the open mouth 101 of a pipe, tube or other female receptacle 103 of substantially constant interior cross-section and includes an external mounting device 29 projected from mouth opening 101.

The mounting device 29 is illustrated here by example and without limitation as a ball-and-socket coupler of the type disclosed by example and without limitation in U.S. Pat. No. 5,845,885, "Universally Positionable Mounting Device" issued to the inventor of the present invention on Dec. 8, 1998, which is incorporated herein by reference. Accordingly, the mounting device 29 includes a substantially rigid base 110 about the same size or larger than the tube's mouth opening 101. In normal use a shoulder portion 132 of the base 110 seats against the mouth opening 101. The shoulder 132 is expected to be larger than the mouth 101 of the target tube 103. According to one embodiment illustrated here by example and without limitation, the external mounting device 29 includes a radially compressible ball portion 31 formed of a resiliently deformable material such as a nitrile rubber material. The ball portion 31 of such a ball-and-socket coupler-type mounting device 29 is extended from the base 110 on a substantially rigid stem or neck 35 of smaller breadth or diameter than the ball portion 31.

The novel anchor mounting platform 100 is fixed in the tube 103 by a laterally expandable lengthwise locking mechanism 32. According to one embodiment of the invention, the laterally expandable locking mechanism 32 is formed by the cooperating movable and stationary wedges 34, 36 that are forced apart laterally by sliding along a sharply inclined plane of mutual contact 42 that is formed between respective inclined reaction and drive surfaces 34a, 36a when their combined lengthwise dimension is forcefully compressed. According to one embodiment, the cooperating wedges 34, 36 are substantially identical in configuration so that a single wedge form or mold is used to produce both of the cooperating wedges 34, 36. However, substantial identity between the cooperating wedges 34, 36 is not necessary and may be eliminated in a practical application of the invention, as discussed herein below. In one example, the stationary near wedge 36 is optionally integrated with the base 110 of the mounting device 29 in a monolithic whole with the shoulder portion 132 being extended laterally outwardly of the stationary wedge 36

A lengthwise drive mechanism 52 cooperates with the laterally expandable locking mechanism 32 for driving the movable farther wedge 34 against the stationary nearer wedge 36 along the inclined plane of mutual contact 42. By example and without limitation, the lengthwise drive mechanism 52 of the invention is configured to pull the inclined drive surface 34a of the movable farther wedge 34 against the inclined reaction surface 36a of the stationary nearer wedge 36 along the inclined plane of mutual contact 42. According to one embodiment of the invention, the lengthwise drive mechanism 52 of the invention is configured having a coupler 38 that is coupled to the movable farther wedge 34 and extended through the lengthwise clearance passage 36b in the stationary nearer wedge 36 and into the base 110 at the tube's mouth 101. As illustrated in subsequent figures, an actuator 40 is coupled to the coupler 38 external of the tube mouth 101 for driving the coupler 38 relative to the tube 103. In other words, the actuator 40 is structured for operating the coupler 38 to draw the movable farther wedge 34 against the stationary nearer wedge 36 by pulling the movable farther wedge 34 along the tube 103 toward the stationary nearer wedge 36 at the tube's mouth 101. The respective sharply inclined reaction and drive surfaces 34a, 36a of the cooperating wedges 34, 36 interact along a sharply inclined plane of mutual contact 42 which forces the cooperating wedges 34, 36 to move crosswise to one another and laterally of the tube 103, as indicated by the outwardly pointing arrows 112. This relative crosswise motion drives the cooperating wedges 34, 36 to jam and wedge laterally against opposing interior walls 103a and 103b of the tube 103. The cooperating wedges 34, 36 thus cause the laterally expandable locking mechanism 32 to fix the anchor mounting platform 100 in the mouth 101 of the tube 103.

The actuator 40 is further structured for operating the coupler 38 to drive the movable farther wedge 34 along the tube 103 away from the stationary nearer wedge 36 along the plane of contact 42. With the lengthwise compression force of the coupler 38 removed, the wedges 34, 36 retract to their normal positions central of the tube 103. The laterally expandable lengthwise locking mechanism 32 is thereby released, which permits extraction of the anchor mounting platform 100 from the tube 103.

The coupler 38 is expected to be operated rotationally relative to the movable farther wedge 34. Therefore, the farther wedge 34 is expected to be rotationally fixed relative to the tube 103, whereby the movable farther wedge 34 is not permitted to spin in the tube 103 when the actuator 40 is operating the coupler 38. By example and without limitation, the movable farther wedge 34 and the interior tube wall 103a are accordingly mutually structured to be rotationally fixed relative to one another.

FIG. 13 illustrates the novel anchor mounting platform 100 having the cooperating wedges 34, 36 of the laterally expandable lengthwise locking mechanism 32 structured for operating in a pipe, tube or other female receptacle 103 having a square or otherwise rectangular interior wall 103a. At least the movable farther wedge 34 is shaped to resist rotation relative to the rectangular interior wall 103a when the coupler 38 is operated. By example and without limitation, the movable farther wedge 34 includes at least one outer contact surface 114 that is formed to compressively interlock with one interior wall 103a of the rectangular tube 103 in a relationship that restricts the movable farther wedge 34 from turning relative to the tube 103. By example and without limitation, at least the one outer contact surface 114 of the movable farther wedge 34 is substantially straight and flat to match the straight and flat interior wall 103a of the rectangular tube 103. Optionally, the movable farther wedge 34 is generally rectangular in shape and sized to slide in the rectangular tube 103 without turning. The nearer wedge 36 includes its own outer contact surface 115 that is formed to compressively interlock with another interior wall 103b of the rectangular tube 103 opposite from the interior wall 103a in a relationship that restricts the nearer wedge 36 from turning relative to the tube 103. The outer contact surfaces 114 and 115 are expected to be substantially parallel with a longitudinal axis 118 of the anchor mounting platform 100, except for a slight draft angle useful in manufacturing, for example when the respective wedges 34 and 36 are die cast or injection molded.

FIG. 14 illustrates the novel anchor mounting platform 100 having the cooperating wedges 34, 36 of the laterally expandable lengthwise locking mechanism 32 structured for operating in a pipe, tube or other female receptacle 103 having a generally cylindrical interior wall 103c. Accordingly, the outer contact surface 114 of the movable farther wedge 34 and the generally cylindrical interior wall 103c are mutually configured to resist relative rotation while the movable farther wedge 34 is sized to slide in the generally cylindrical tube 103. According to one embodiment, the outer contact surface 114 of the movable farther wedge 34 and the interior tube wall 103c are both configured with mating flats that restrict the movable farther wedge 34 from turning in the otherwise generally cylindrical tube 103.

FIG. 15 is a bottom perspective view of the novel anchor mounting platform 100 that illustrates another alternative configuration for restricting the movable farther wedge 34 from turning in the tube 103 whether it is cylindrical or rectangular. Here, the cooperating wedges 34, 36 of the laterally expandable locking mechanism 32 are illustrated as being structured for operating in a tube 101 having a generally cylindrical interior wall 103c. By example and without limitation, at least the movable farther wedge 34 is configured with a keyway 116 oriented lengthwise along the longitudinal axis 118 of the anchor mounting platform 100. Optionally, the stationary nearer wedge 36 is similarly formed with a keyway 120 oriented lengthwise along the longitudinal axis 118 of the anchor mounting platform 100 and substantially aligned with the keyway 116 of the movable farther wedge 34.

FIG. 16 is a partial cross-section view taken through the keyway 116 of the movable farther wedge 34 and, when present, the keyway 120 of the stationary nearer wedge 36. A key 122 is received into at least the keyway 116 of the movable farther wedge 34 and, when present, optionally the keyway 120 of the stationary nearer wedge 36, as illustrated here. The key 122 is optionally integrally formed with the interior tube wall 103c or otherwise coupled to the tube 103.

Alternatively, the key 122 may be free floating, that is not attached to the tube 103. For example, the stationary nearer wedge 36 is either integrated with the base 110 of the anchor mounting device 29 in a monolithic whole or otherwise coupled thereto in a manner that substantially prevents independent rotation. The key 122 is extended between the keyways 116 and 120 of the respective farther and nearer wedges 34 and 36. As illustrated here, the cooperating wedges 34, 36 are configured to resist mutual rotation when the coupler 38 is operated. Accordingly, the movable farther wedge 34 is effectively restrained from rotating relative to the stationary nearer wedge 36 by the key 122 extended therebetween. When at least the base 110 of the mounting device 29 is restrained from turning in the tube 103, the key 122 ties the movable farther wedge 34 to the stationary nearer wedge 36 and restrains it from turning as well.

FIG. 17 is a cross-sectional view of one embodiment of the novel anchor mounting platform 100. As illustrated here by example and without limitation, the cooperating wedges 34, 36 are formed with the cooperating respective lengthwise hollow cavities 34d, 36d that communicate with one another along the plane of contact 42. Optionally, as disclosed herein, the disengaging mechanism 43 is provided for disengaging the wedges 34, 36 from their interlocked relationship. For example, the disengaging mechanism 43 is embodied as the strong compression spring 44 for disengaging the wedges 34, 36, for example by pushing the movable farther wedge 34 away from the stationary nearer wedge 36. For example, the compression spring 44 is positioned between the cooperating wedges 34, 36 when the compression spring 44 is compressed to fit into the communicating cavities 34d, 36d. As disclosed herein, the spring 44 is sized having an uncompressed length that is longer than a combined length of the communicating lengthwise cavities 34d, 36d in the respective wedges 34, 36. When the movable farther wedge 34 is drawn against the stationary nearer wedge 36 by applied lengthwise tension of the threaded coupler 38, the compression spring 44 is compressed within the lengthwise cavities 34d, 36d between their opposing respective floor portions 34e, 36e. However, when effectively compressed, the compressed length of the spring 44 does not interfere with engagement of the inclined reaction and drive surfaces 34a, 36a along the plane of contact 42 and consequent lateral spreading of the wedges 34, 36 during lateral expansion and engagement of the locking mechanism 32.

Upon relief of the lengthwise tension of the threaded coupler 38, expansion spring force in the compressed spring 44 operates against the opposing floor portions 34e, 36e of the wedge lengthwise cavities 34d, 36d. The expansion spring force operates to push apart and disengage the two interacting wedges 34, 36 to release the laterally expandable lengthwise locking mechanism 32. The expansion force in the spring 44 is sufficiently strong that, when the tension in the lengthwise coupler 38 is relieved, decompression and expansion of the spring 44 overcomes the jamming force that holds the wedges 34, 36 against the inner walls 103a, 103b or 103c of the tube 103. Disengagement from the tube inner walls 103a, 103b or 103c permits the wedges 34, 36 to retract and return to their normal positions central of the tube 103 where they slide freely. The lateral expansion locking mechanism 32 is released, and the anchor mounting platform 100 is free to be removed from the tube 103.

By example and without limitation, the coupler 38 is embodied as an elongated threaded rod or bolt or other threaded fastener that is extended lengthwise through the two cooperating wedges 34, 36. For example, the coupler 38 is extended lengthwise through the two cooperating wedges 34, 36 and the stem or neck 35 of the mounting device 29. The actuator 40 is embodied as the bolt head 38b of the coupler 38 having an actuation surface 123 on its underside that is seated against a reaction surface 124 within either the stem portion 35 or ball portion 31 of the ball-and-socket coupler-type mounting device 29.

The threaded coupler 38 is extended through the stem portion 35 or ball portion 31 of the mounting device 29 by, for example, passing though a clearance bore 126 that is substantially aligned with the longitudinal axis 118 of the anchor mounting platform 100 and the wedges 34, 36. The threaded coupler 38 is further extended through the near and far wedges 36, 34 by passing through the lengthwise clearance passage 36b in the stationary near wedge 36, and through another lengthwise clearance passage 34b in the movable far wedge 34. The lengthwise clearance passages 34b, 36b are substantially aligned with the anchor mounting platform's longitudinal axis 118 and are sized to slidingly pass the threaded coupler 38 therethrough without appreciable interference and yet simultaneously substantially center the threaded coupler 38 relative to both wedges 34, 36 and the surrounding tube 103.

A threaded drive 128 is embodied as a female thread mechanism 129 provided on the movable far wedge 34 and matched to male threads 38a formed on the threaded coupler 38. By example and without limitation, the female thread mechanism 129 is embodied as a hex or other nut 131 positioned adjacent to an end portion 130 of the movable far wedge 34 and threadedly engaged with the threads 38a of the threaded coupler 38. When embodied as the engaged nut 131, the female thread mechanism 129 is secured against rotation when the male threaded coupler 38 is operated. For example, the socket 34c is embodied as a nut pocket provided in the end portion 130 of the movable far wedge 34 in communication with the lengthwise clearance passage 34b into the lengthwise cavity 34d and substantially aligned therewith. The nut pocket 34c is structured to retain the engaged threaded nut 131 and restrain it from turning when a rotational torque is applied thereto by the threaded coupler 38.

Alternatively, the female thread mechanism 129 of the threaded drive 128 is provided on the movable far wedge 34 by the lengthwise female threaded passage 34p that is substituted for the lengthwise clearance passage 34b. The threaded coupler 38 is threaded into the lengthwise female threaded passage 34p that is substituted for the lengthwise clearance passage 34b through the movable farther wedge 34, as disclosed herein.

Turning the actuation surface 123 of the bolt head actuator 40 against the reaction surface 124 actuates the threaded drive 128 by rotating the threaded coupler 38 and the male threads 38a thereof relative to the engaged nut 131, threaded passage 34p or other female thread mechanism 129 in the end portion 130 of the movable far wedge 34. The engaged nut 131, threaded passage 34p or other female thread mechanism 129 is threadedly moved along the male threads 38a of the threaded coupler 38, which generates the lengthwise compression force in the coupler 38. The lengthwise compression force generated in the threaded coupler 38 in turn forces the movable farther wedge 34 lengthwise toward the stationary nearer wedge 36 along the threaded coupler 38 and the inside walls 103a, 103b or 103c of the tube 103. Other lengthwise drive mechanisms 52 are also contemplated for drawing the movable farther wedge 34 against the stationary nearer wedge 36 and may be substituted without deviating from the scope and intent of the invention. For example, a cam and lever mechanism is optionally substituted for the threaded coupler 38 and bolt head actuator 40 of the lengthwise drive mechanism 52.

Forcing the cooperating farther wedge 34 lengthwise of the threaded coupler 38 and against the nearer cooperating wedge 36 engages the respective inclined reaction and drive surfaces 34a, 36a along the sharply inclined plane of mutual contact 42. Interaction of the respective sharply inclined reaction and drive surfaces 34a, 36a along a sharply inclined plane of mutual contact 42 forces the cooperating wedges 34, 36 to move crosswise to one another and laterally of the tube 103, as indicated by the outwardly pointing arrows 112. This relative crosswise motion drives the cooperating wedges 34, 36 to jam and wedge laterally against interior walls 103a, 103b or 103c of the tube 103. Lateral expansion of the cooperating wedges 34, 36 thus cause the locking mechanism 32 to fix the anchor mounting platform 100 lengthwise of the tube 103.

Reversing the actuator 40 reverses the rotation of the threaded drive 128 by reversing the male threaded coupler 38 relative to the engaged nut 131, threaded passage 34p or other female thread mechanism 129 and permits the movable farther wedge 34 to back away from the stationary nearer wedge 36 along the plane of contact 42. When the female thread mechanism 129 of the threaded drive 128 is alternatively provided by the lengthwise threaded passage 34p formed within the lengthwise clearance passage 34b at the end 130 of the movable far wedge 34, as disclosed herein, the reversing rotation of the threaded coupler 38 actually drives the movable far wedge 34 away from the stationary nearer wedge 36.

With the lengthwise force of the threaded coupler 38 removed, the movable and stationary wedges 34, 36 return to their normal positions central of the tube 103. The lateral expansion of the lengthwise locking mechanism 32 is thereby released, which permits removal of the anchor mounting platform 100 from the tube 103.

According to one embodiment of the novel anchor mounting platform 100 the base 110 of the mounting device 29 is split between the stem portion 35 and the nearer wedge 36, which is an optional embodiment as disclosed herein. Accordingly, the stationary nearer wedge 36 is formed with the shoulder portion 132 of the base 110 opposite from its inclined reaction surface 36a, with the shoulder 132 being wider than the wedge 36. The shoulder 132 seats against the tube's mouth opening 101. The base 110 of the external mounting device 29 is optionally rotationally coupled to the shoulder portion 132 of the wedge 36 in a manner that prohibits the mounting device 29 from rotating independently of the stationary wedge 36. By example and without limitation, a coupling mechanism 134 is fixed between the base 110 of the mounting device 29 and the shoulder 132 of the stationary wedge 36 for restricting rotation therebetween. By example and without limitation, the coupling mechanism 134 includes a substantially rigid disk-like plate 136 having a central clearance aperture 138 therethrough sized to pass the threaded coupler 38. Oppositely directed projections 140 and 142 project from opposite sides of the plate 136 and seat in mating indentations 144 and 146 in respective opposing faces of the base 110 of the mounting device 29 and the shoulder 132 of the stationary nearer wedge 36. By example and without limitation, a plurality of the oppositely directed projections 140 and 142 are formed in respective rings on the opposite sides of the plate 136 and mate with respective rings of the indentations 144 and 146 in the respective base 110 of the mounting device 29 and shoulder 132 of the stationary nearer wedge 36. Other configurations of the coupling mechanism 134 are also contemplated for fixing the mounting device 29 relative to the stationary nearer wedge 36 and may be substituted without deviating from the scope and intent of the invention. For example, a pattern of interleaved teeth and sockets is optionally substituted for the projections 140, 142 and mating indentations 144, 146.

FIG. 18 is an exploded assembly view of the configuration of the novel anchor mounting platform 100 as embodied in FIG. 17.

FIG. 19 illustrates the novel anchor mounting platform 100 wherein the female thread mechanism 129 of the threaded drive 128 is alternatively provided on the movable far wedge 34 by the threaded end 38a of the threaded coupler 38 being mated with the lengthwise female threaded passage 34p that is substituted for the lengthwise clearance passage 34b. The threaded coupler 38 is threaded into the lengthwise threaded passage 34p through the movable farther wedge 34, as disclosed herein.

Additionally, as disclosed here the male threaded coupler 38 is embodied as an elongated screw or bolt having a star, square, hex or equivalent bolt head 38b which operates as the actuator 40 having the actuation surface 123 that is seated against the reaction surface 124 within either the stem portion 35 or ball portion 31 of the ball-and-socket coupler-type mounting device 29. The bolt head actuator 40 is secured against rotation relative to the mounting device 29. For example, a nut pocket 148 is provided in either the stem portion 35 or ball portion 31 in communication with the clearance bore 126 though the mounting device 29 and substantially aligned therewith. The nut pocket 148 is structured to retain the bolt head actuator 40 and restrain it from turning when a rotational torque is applied thereto by rotation of the mounting device 29 relative to the stationary near wedge 36.

Here, the mounting device 29 is rotatable about the longitudinal axis 118 of the anchor mounting platform 100 independently of the stationary near wedge 36, whereby the mounting device 29 is rotated to operate to the bolt head actuator 40, i.e. bolt head 38b, which activates the threaded drive 128. The bolt head actuator 40 turns the coupler 38 relative to the engaged nut 131, threaded passage 34p or other female thread mechanism 129 to generate the rotational torque that to force the movable far wedge 34 toward the stationary near wedge 36 along the inclined plane of mutual contact 42. Accordingly, a rotational slip mechanism 150, such as a slip bushing or thrust bearing, is positioned between the respective opposing faces of the base 110 of the mounting device 29 and the shoulder 132 of the stationary nearer wedge 36. The slip mechanism 150 permits the mounting device 29 to be easily rotated about the longitudinal axis 118 of the anchor mounting platform 100 independently of the stationary near wedge 36, while the near wedge 36 remains stationary relative to the tube 103 with its shoulder 132 seated firmly against the tube mouth 101. Optionally, as illustrated by example and without limitation, the slip mechanism 150 cooperates with the indentations 144 and 146 in the respective base 110 of the mounting device 29 and shoulder 132 of the stationary nearer wedge 36. Other configurations of the slip mechanism 150 are also contemplated for permitting the mounting device 29 to rotated relative to the stationary nearer wedge 36 and may be substituted without deviating from the scope and intent of the invention.

Alternatively, the threaded coupler 38 is reversed such that the bolt head 38b is fit in the nut pocket 34c (shown in FIG. 17) in the end portion 130 of the movable far wedge 34, and one of either the stem portion 35 or ball portion 31 of the mounting device 29 is formed with the mating lengthwise threaded passage 34p. Accordingly, the mounting device 29 operates as the actuator 40 to pull the threaded coupler 38 along the longitudinal axis 118 of the anchor mounting platform 100 toward the stationary near wedge 36 along the inclined plane of contact 42, as generally disclosed herein. Again, the mounting device 29 is rotatable independently of the stationary near wedge 36 by means of the slip mechanism 150 therebetween.

FIG. 20 is an exploded assembly view of the configuration of the novel anchor mounting platform 100 as embodied in FIG. 19.

Figures 21, 22:
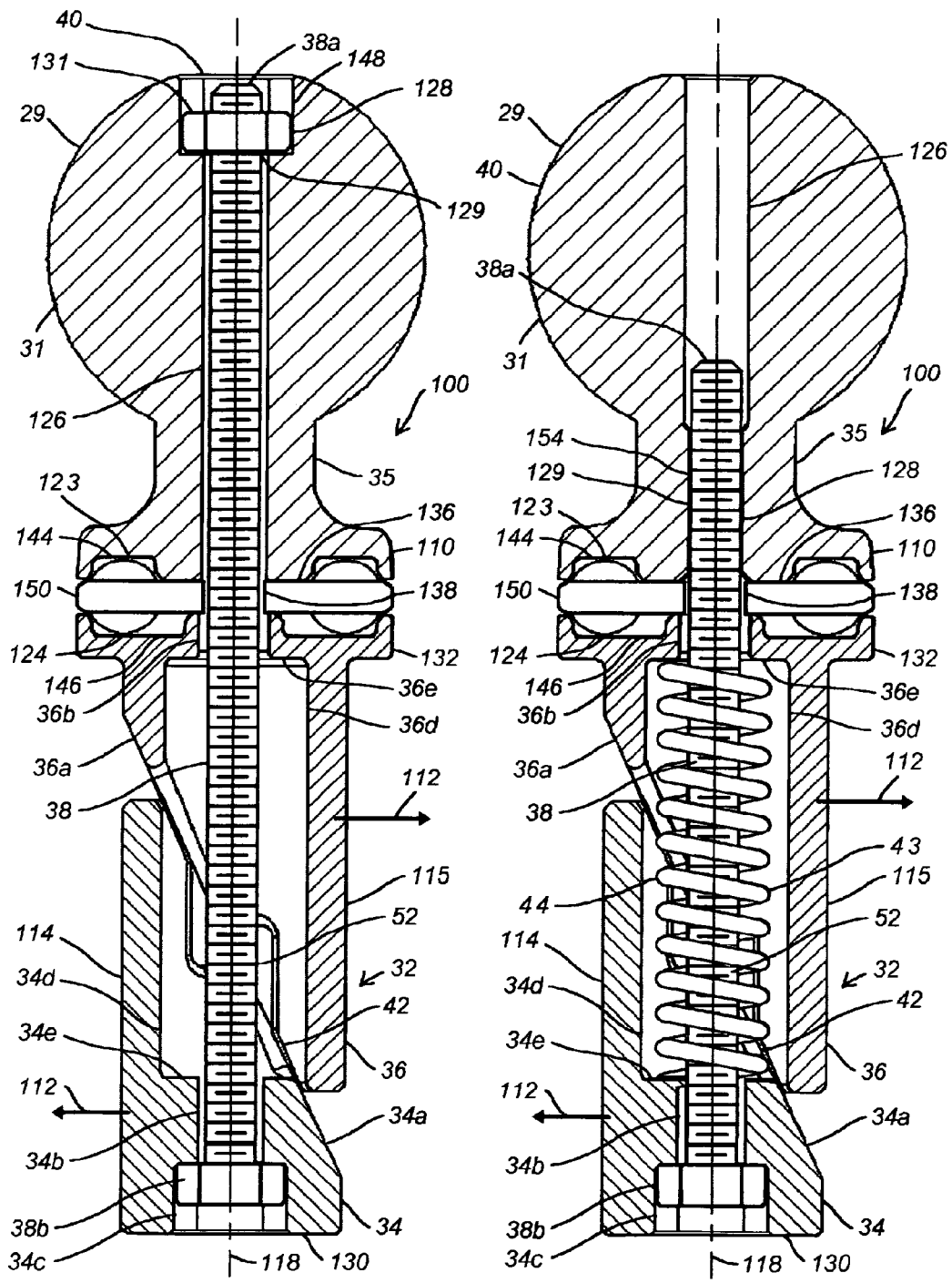
FIG. 21 and FIG. 22 each illustrate different embodiments of the novel anchor mounting platform wherein a slip mechanism is positioned between respective opposing faces of the base of the mounting device and a shoulder portion of the stationary nearer wedge, whereby the threaded drive can be reversed or inverted.

FIG. 21 and FIG. 22 each illustrate that, when the slip mechanism 150 is positioned between the respective opposing faces of the base 110 of the mounting device 29 and the shoulder 132 of the stationary nearer wedge 36, the threaded drive 128 can be reversed. For example, the threaded coupler 38 is reversed such that the bolt head 38b is restrained in the movable far wedge 34, while the threaded end 38a of the reversed coupler 38 is mated with the engaged nut 131, threaded passage 34p or other female thread mechanism 129 formed in the mounting device 29. For example, FIG. 21 illustrates the threaded coupler 38 being passed through the lengthwise clearance passage 34b in the movable far wedge 34, and the bolt head 38b being fit in the nut pocket 34c in the far wedge end portion 130. The nut pocket 148 is provided in either the stem portion 35 or ball portion 31 of the mounting device 29 and in communication with the clearance bore 126 and substantially aligned therewith. The threaded drive 128 is provided by the male threaded end 38a of the threaded coupler 38 being engaged with the engaged nut 131, threaded passage 34p or other female thread mechanism 129. Here, for example, the thread mechanism 129 is embodied as the engaged hex nut 131 positioned in the nut pocket 148. The nut pocket 148 is structured to retain the engaged nut 131 and restrain it from turning when a rotational torque is applied thereto by rotation of the mounting device 29 relative to the stationary near wedge 36.

Accordingly, the mounting device 29 operates as the actuator 40 to pull the threaded coupler 38 along the longitudinal axis 118 of the anchor mounting platform 100 toward the stationary near wedge 36 along the inclined plane of contact 42, as generally disclosed herein. The mounting device 29 operates as the actuator 40 and includes the actuation surface 123 seated against the shoulder 132 portion of the stationary nearer wedge 36, which operates as the reaction surface 124 for the mounting device 29. Again, the mounting device 29 is rotatable independently of the stationary near wedge 36 by means of the slip mechanism 150 therebetween.

Alternatively, FIG. 22 illustrates the thread mechanism 129 of the threaded drive 128 is embodied as a lengthwise threaded passage 154 positioned in the clearance bore 126 formed in either the ball portion 31 or stem portion 35 of the mounting device 29. The threads 38a of the threaded coupler 38 are mated with the threaded passage 154. Accordingly, the mounting device 29 operates as the actuator 40 against the shoulder 132 portion of the stationary nearer wedge 36, which operates as the reaction surface 124. The actuator 40 operates to pull the threaded coupler 38 along the longitudinal axis 118 of the anchor mounting platform 100 toward the stationary near wedge 36 along the inclined plane of contact 42, as generally disclosed herein. Again, the mounting device 29 is rotatable independently of the stationary near wedge 36 by means of the slip mechanism 150 therebetween.

As further illustrated here, the optional disengaging mechanism 43 disclosed herein is provided for disengaging the wedges 34, 36 from their interlocked relationship. By example and without limitation, the disengaging mechanism 43 is embodied as the strong compression spring 44 is compressed to fit into the communicating cavities 34d, 36d for disengaging the wedges 34, 36 by pushing the movable farther wedge 34 away from the stationary nearer wedge 36. As disclosed herein, the spring 44 is sized having an uncompressed length that is longer than a combined length of the communicating lengthwise cavities 34d, 36d in the respective wedges 34, 36. When the movable farther wedge 34 is drawn against the stationary nearer wedge 36 by applied lengthwise tension of the threaded coupler 38, the compression spring 44 is compressed within the lengthwise cavities 34d, 36d between their opposing respective floor portions 34e, 36e. However, the compressed length of the spring 44 does not interfere with engagement of the inclined reaction and drive wedge surfaces 34a, 36a along the plane of contact 42 and consequent lateral spreading of the wedges 34, 36 during lateral expansion and engagement of the locking mechanism 32.

Figure 23:
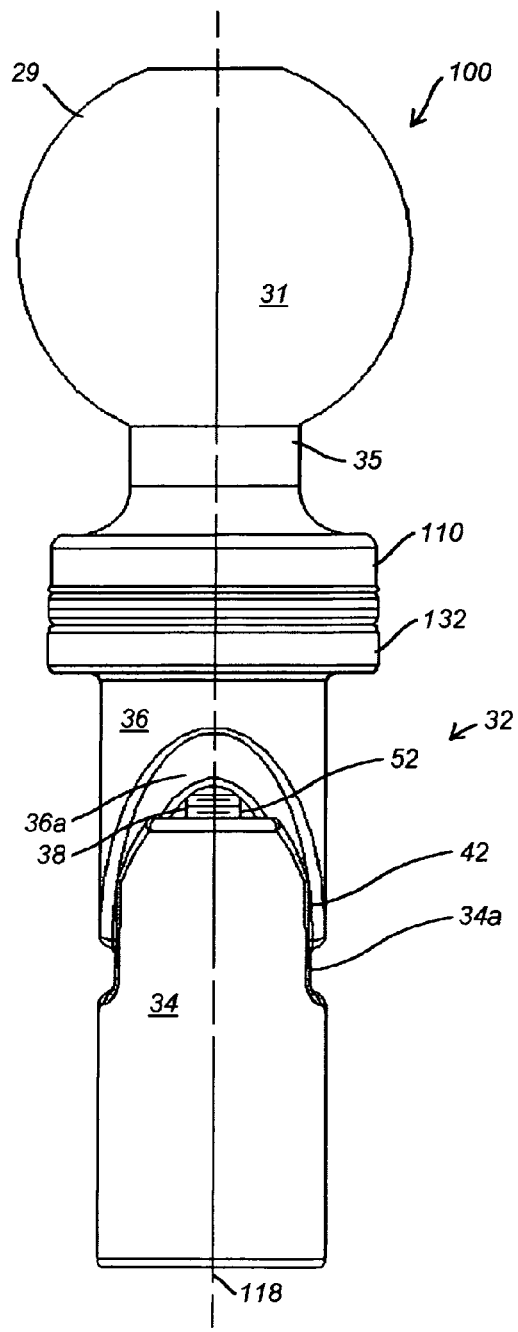
FIG. 23 is an end view of the novel anchor mounting platform embodied for use in a generally cylindrical pipe, tube or other female receptacle.

FIG. 23 is an end view of the novel anchor mounting platform 100 embodied for use in a generally cylindrical pipe, tube or other female receptacle 103.

Figure 24:
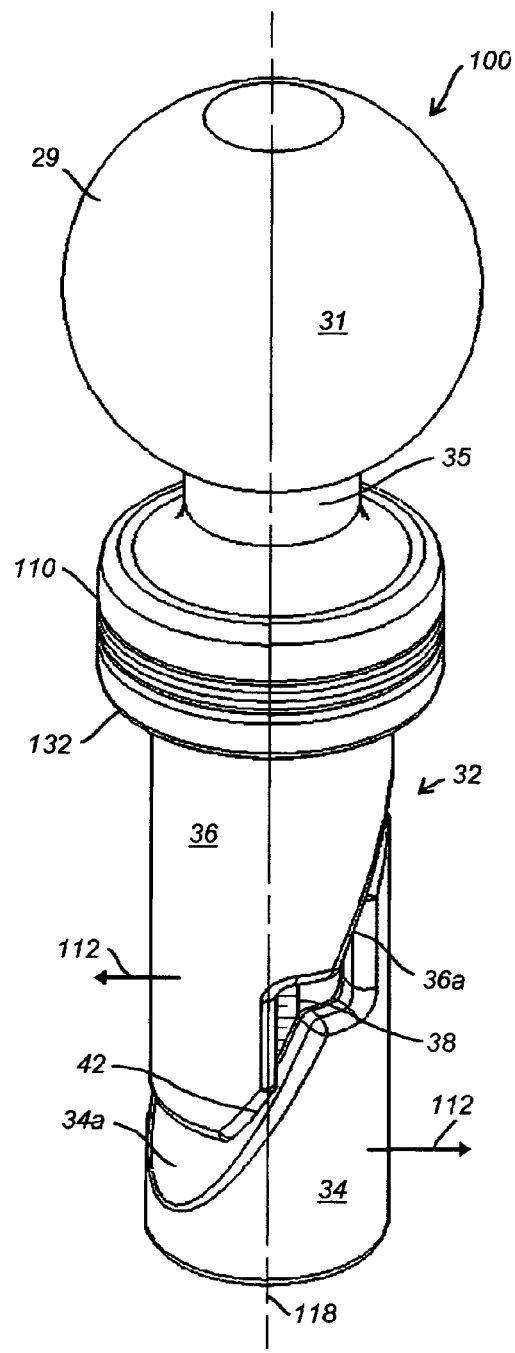
FIG. 24 is a side perspective view of the novel anchor mounting platform embodied for use in a generally cylindrical pipe, tube or other female receptacle.

FIG. 24 is a side perspective view of the novel anchor mounting platform 100 embodied for use in a generally cylindrical pipe, tube or other female receptacle 103.

Figures 25, 26:
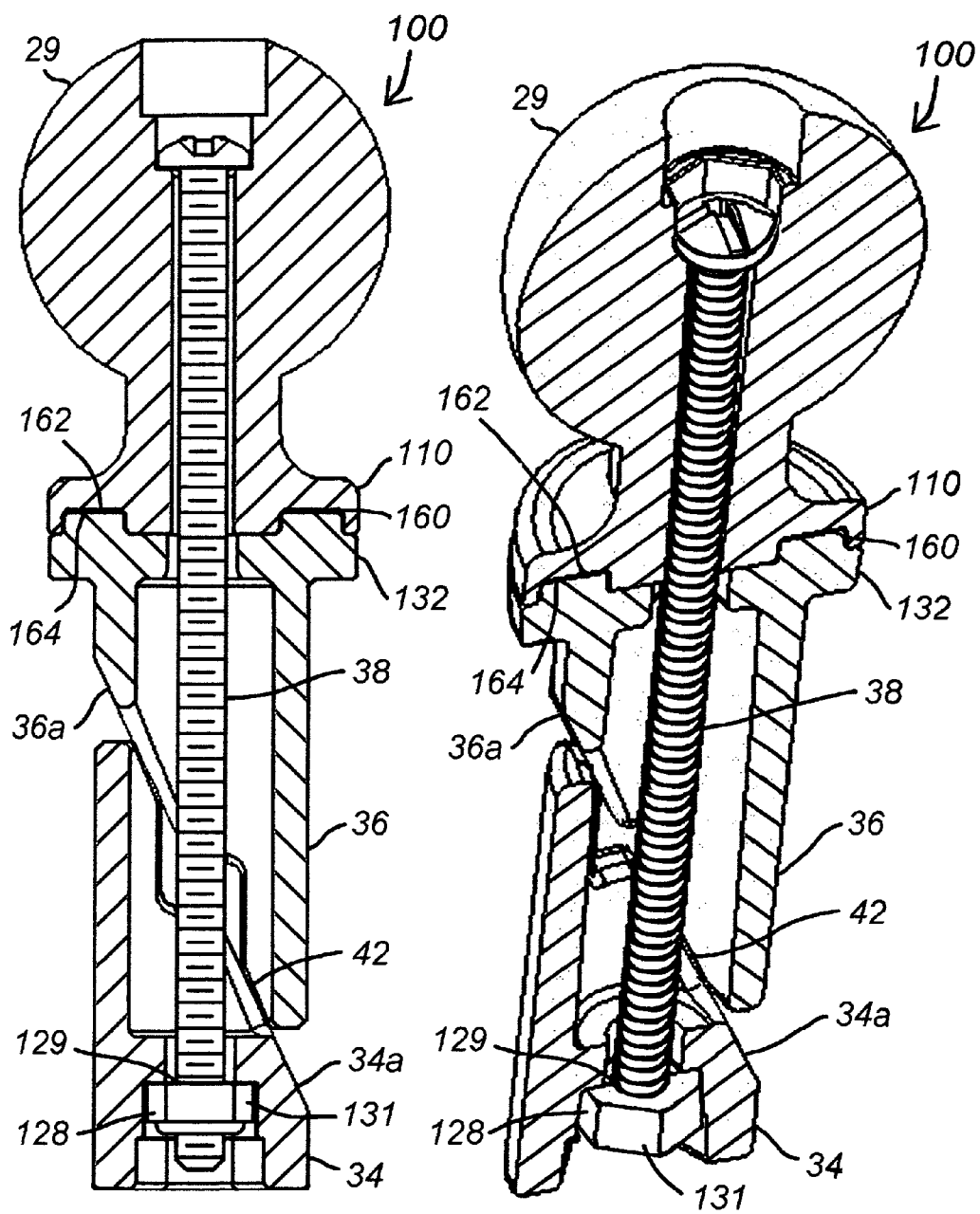
FIGS. 25 and 26 are cross-sectional view of the novel anchor mounting platform that illustrate an alternative embodiment having an alternative coupling mechanism provided directly between a base portion of the mounting device and a shoulder portion of the stationary wedge for restricting rotation therebetween.

FIGS. 25 and 26 are cross-sectional view of the novel anchor mounting platform that illustrate an alternative embodiment having an alternative coupling mechanism 160 provided directly between the base 110 of the mounting device 29 and the shoulder 132 of the stationary wedge 36 for restricting rotation therebetween. By example and without limitation, the coupling mechanism 160 is embodied here as projections 162 projected from either the face of the mounting device base 110 or the shoulder 132 of the stationary nearer wedge 36 (shown), which seat in mating indentations 164 in the opposing shoulder 132 of the stationary nearer wedge 36 or the face of the mounting device base 110 (shown). By example and without limitation, a plurality of the oppositely directed projections 162 and mating indentations 164 are formed in respective rings on the respective shoulder 132 of the stationary nearer wedge 36 and base 110 of the mounting device 29. The alternative coupling mechanism 160 is alternatively inverted with the as projections 162 projected from either the face of the mounting device base 110, and the mating indentations 164 in the opposing shoulder 132 of the stationary nearer wedge 36. Other configurations of the coupling mechanism 160 are also contemplated for fixing the mounting device 29 relative to the stationary nearer wedge 36 and may be substituted without deviating from the scope and intent of the invention. For example, a pattern of interleaved teeth and sockets is optionally substituted for the projections 162 and mating indentations 164 formed between the mating faces of the mounting device base 110 and the opposing shoulder 132 of the stationary nearer wedge 36.

Figure 27:
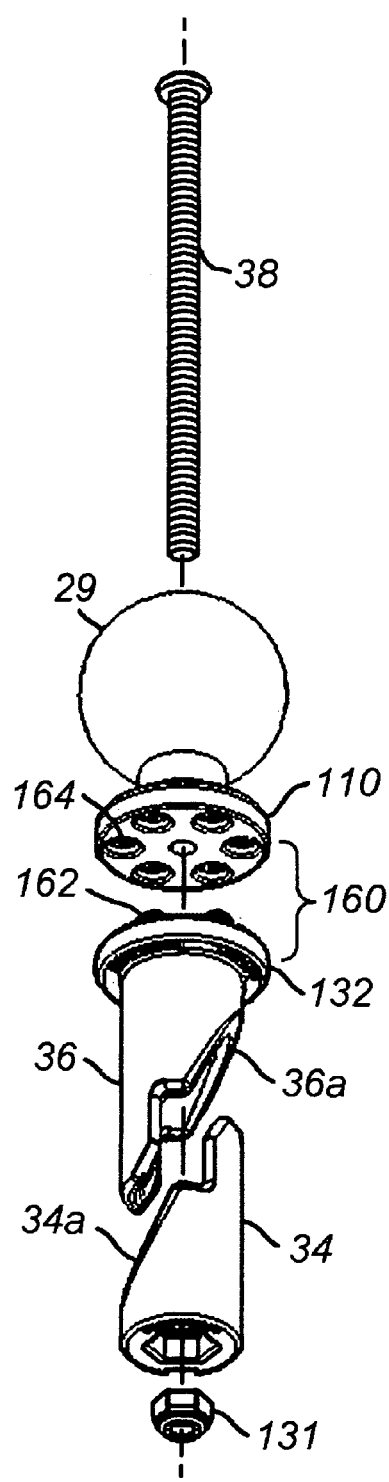
Figure 28:
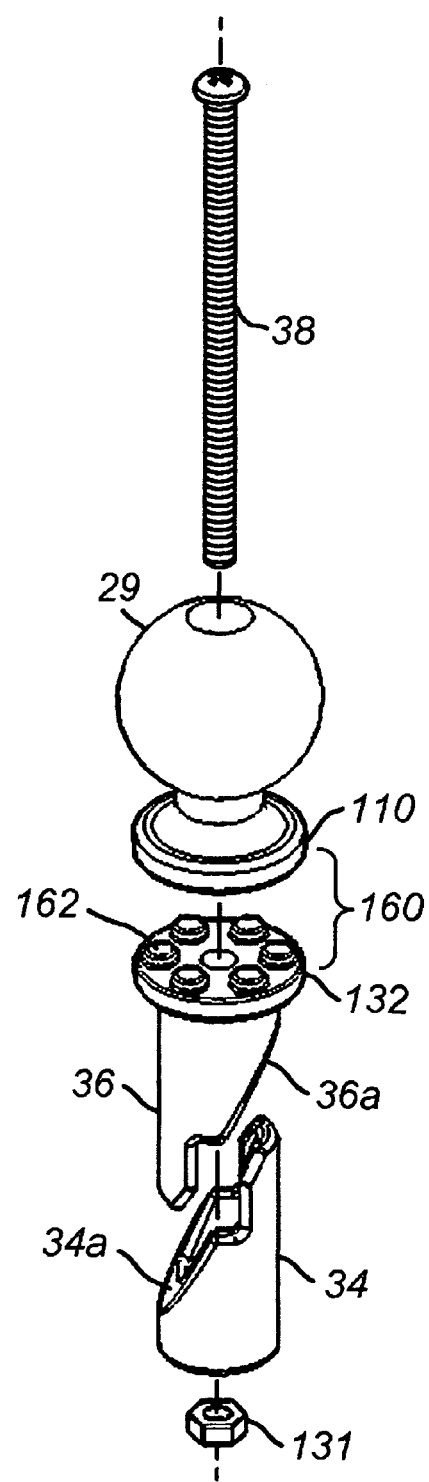

FIGS. 27 and 28 are exploded assembly views of the configuration of the alternative novel anchor mounting platform 100 as embodied in FIGS. 25 and 26, wherein the alternative coupling mechanism 160 is provided directly between the base 110 of the mounting device 29 and the shoulder 132 of the stationary wedge 36 for restricting rotation therebetween. FIG. 27 is an upward perspective view of the exploded assembly of the alternative novel anchor mounting platform 100 that more clearly shows the coupling mechanism 160 embodied by example and without limitation as having the projections 162 projected from the shoulder 132 of the stationary nearer wedge 36 for seating in the mating indentations 164 in the opposing face of the base 110 of the mounting device 29.

FIG. 28 is a downward perspective view of the exploded assembly of the alternative novel anchor mounting platform 100 that more clearly shows the coupling mechanism 160 embodied by example and without limitation as having the mating indentations 164 formed in the opposing face of the base 110 of the mounting device 29, and having the projections 162 projected from the shoulder 132 of the stationary nearer wedge 36 for seating in the mating indentations 164.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. An anchor mount, comprising:
a mounting device;
a laterally expandable locking mechanism coupled to a base of the mounting device, the laterally expandable locking mechanism comprising first and second cooperating wedges, at least one of the first and second cooperating wedges further comprising a keyway recessed into an outer surface thereof, the first wedge being coupled to the base of the mounting device, and the second wedge being movable along an inclined plane of mutual contact with the first wedge and substantially laterally expandable relative thereto;
a reaction surface fixed relative to the first wedge;
an actuator comprising an actuation surface that is positioned adjacent to the reaction surface and movable relative thereto;
the second wedge being responsive to motion of the actuation surface of the actuator relative to the reaction surface for moving along the inclined plane of mutual contact with the first wedge and substantially laterally expanding relative thereto; and
a substantially rigid key extended between the first and second wedges and received into the recessed keyway.

2. The anchor mount of claim 1 wherein the motion of the actuation surface of the actuator relative to the reaction surface further comprises a rotational motion of the actuator.

3. The anchor mount of claim 2 wherein the laterally expandable locking mechanism further comprises a threaded drive coupled to the actuator and operable thereby about a longitudinal axis thereof responsively to the rotational motion of the actuator, the second wedge moving along the inclined plane of mutual contact with the first wedge and substantially laterally expanding relative thereto responsively an operation of the threaded drive by the actuator.

4. The anchor mount of claim 3 wherein the threaded drive further comprises an elongated threaded coupler engaged with a mating thread mechanism.

5. The anchor mount of claim 4 wherein the elongated threaded coupler of the threaded drive further comprises an elongated threaded fastener, and the mating thread mechanism further comprises a female thread matched to threads on an end of the threaded fastener.

6. The anchor mount of claim 5 wherein the elongated threaded coupler of the threaded drive further comprises the actuator as a head portion thereof having an undersurface thereof comprising the actuation surface, and
the female thread of the mating thread mechanism further comprises a female thread substantially nonrotationally coupled to the second wedge.

7. The anchor mount of claim 5, further comprising a rotational slip mechanism between the mounting device and a portion of the first wedge opposite from the inclined plane of mutual contact with the second wedge; and wherein:
the mounting device further comprises the female thread of the mating thread mechanism, the actuator and the actuation surface, wherein the actuation surface is formed on a first side of the rotational slip mechanism;
the first wedge further comprises the reaction surface opposite from the inclined plane of mutual contact with the second wedge and on a second side of the rotational slip mechanism opposite from the actuation surface; and
a portion of the elongated threaded coupler that is spaced away from the end thereof having threads thereon is further substantially nonrotationally coupled to the second wedge.

8. An anchor mount, comprising:
a mounting device comprising a substantially rigid base; and
a laterally expandable locking mechanism comprising:
a first wedge comprising a keyway recessed into an outer surface thereof and being coupled to the base of the mounting device,
a second wedge comprising a keyway recessed into an outer surface thereof and cooperating with the first wedge and being slidable along a plane of mutual contact therewith that is inclined relative to a nominal direction of travel of the second wedge,
a lengthwise drive mechanism that is coupled between the first and second wedges, and
an actuator coupled to a portion of the lengthwise drive mechanism,
a substantially rigid key coupled between the keyways in the first and second wedges, and wherein the lengthwise drive mechanism is further responsive to operation of the actuator for driving the second wedge against the first wedge along the plane of contact.

9. The anchor mount of claim 8 wherein the operation of the actuator further comprises a rotational motion of the actuator.

10. The anchor mount of claim 9 wherein the lengthwise drive mechanism further comprises:
   an elongated threaded shaft having a head portion adjacent to a first end thereof and comprising the actuator, and a male thread adjacent to a second end thereof spaced away from the head, and
   a mating female thread substantially nonrotationally coupled relative to the second wedge.

11. The anchor mount of claim 10, further comprising a rotational slip mechanism between an actuation surface of the mounting device and a shoulder portion of the first wedge opposite from the plane of mutual contact with the second wedge.

12. The anchor mount of claim 11 wherein the head portion of the elongated threaded coupler is further substantially nonrotationally coupled to the mounting device.

13. The anchor mount of claim 9, further comprising a rotational slip mechanism between the base of the mounting device and a shoulder portion of the first wedge opposite from the plane of mutual contact with the second wedge; and wherein:
   the lengthwise drive mechanism further comprises:
      an elongated threaded shaft having a first end thereof substantially nonrotationally coupled to the second wedge, and a male thread adjacent to a second end thereof spaced away from the first end, and
      a mating female thread mechanism substantially nonrotationally coupled to the mounting device.

14. An anchor mount, comprising:
   a mounting device comprising a substantially rigid base and a reaction surface; and
   a laterally expandable locking mechanism coupled to the base of the mounting device and substantially aligned along a longitudinal axis substantially perpendicular thereto, the laterally expandable locking mechanism comprising:
      a first wedge coupled to the base of the mounting device and comprising a first outer contact surface oriented substantially parallel with the longitudinal axis and a reaction surface inclined relative thereto, and further comprising a first keyway recessed into the first outer contact surface thereof,
      a second wedge cooperating with the first wedge, the second wedge comprising a second outer contact surface opposite from the first outer contact surface of the first wedge and oriented substantially parallel with the longitudinal axis, and a drive surface inclined relative thereto and substantially positioned in a cooperating relationship with the inclined reaction surface of the first wedge and being nominally slidable there along toward the base of the mounting device and laterally of the longitudinal axis, and further comprising a second keyway recessed into the second outer contact surface thereof and substantially aligned with the first keyway,
      a substantially rigid key coupled between the first and second keyways of the respective first and second wedges,
      a thread mechanism substantially aligned with the longitudinal axis, and
      an actuator comprising an actuation surface that is positioned adjacent to the reaction surface of the mounting device opposite from the first wedge, and further comprising a threaded coupler extended between the actuation surface and the second wedge and matched to the thread mechanism.

15. The anchor mount of claim 14 wherein the threaded coupler further comprises an elongated threaded shaft having a head portion adjacent to a first end thereof and comprising the actuator with an underside thereof further comprising the actuation surface, and a male thread adjacent to a second end thereof spaced away from the head portion, and
   the thread mechanism further comprises a mating female thread substantially nonrotationally coupled to the second wedge.

16. The anchor mount of claim 15 wherein the base of the mounting device is further substantially nonrotationally coupled to the first wedge opposite from the inclined reaction surface thereof.

17. The anchor mount of claim 16 wherein the second wedge further comprises a nut pocket opposite from the inclined drive surface thereof; and
   the mating female thread of the thread mechanism further comprises a mating nut positioned in the nut pocket.

18. The anchor mount of claim 17 wherein the first wedge further comprises a shoulder portion opposite from the inclined reaction surface thereof and adjacent to the base of the mounting device.

19. The anchor mount of claim 1 wherein each of the first and second cooperating wedges further comprises a keyway recessed into an outer surface thereof; and
   wherein the key is further received into the keyways of both the first and second wedges.

* * * * *